United States Patent
Roots et al.

(10) Patent No.: US 9,014,614 B2
(45) Date of Patent: Apr. 21, 2015

(54) COGNITIVE ASSESSMENT AND TREATMENT PLATFORM UTILIZING A DISTRIBUTED TANGIBLE-GRAPHICAL USER INTERFACE DEVICE

(71) Applicants: Kurt Edward Roots, Minneapolis, MN (US); Monika Drummond Roots, Minneapolis, MN (US)

(72) Inventors: Kurt Edward Roots, Minneapolis, MN (US); Monika Drummond Roots, Minneapolis, MN (US)

(73) Assignee: Cogcubed Corporation, Minneapolis, MN (US)

( * ) Notice: Subject to any disclaimer, the term of this patent is extended or adjusted under 35 U.S.C. 154(b) by 48 days.

(21) Appl. No.: 13/657,332

(22) Filed: Oct. 22, 2012

(65) Prior Publication Data

US 2013/0101976 A1 Apr. 25, 2013

Related U.S. Application Data

(60) Provisional application No. 61/549,698, filed on Oct. 20, 2011, provisional application No. 61/551,384, filed on Oct. 25, 2011.

(51) Int. Cl.
G09B 7/00 (2006.01)
G09B 5/06 (2006.01)

(52) U.S. Cl.
CPC .......................................... G09B 5/06 (2013.01)

(58) Field of Classification Search
CPC ............ G06F 19/3406; G06F 19/3418; G06F 3/0346; G06F 3/038; G06F 19/345
USPC .................................................. 434/236, 362
See application file for complete search history.

(56) References Cited

U.S. PATENT DOCUMENTS

| | | | |
|---|---|---|---|
| 5,344,326 A * | 9/1994 | Ferris | 434/336 |
| 5,377,100 A | 12/1994 | Pope et al. | |
| 5,513,991 A * | 5/1996 | Reynolds et al. | 434/81 |
| 5,913,310 A | 6/1999 | Brown | |
| 5,940,801 A | 8/1999 | Brown | |
| 6,053,739 A | 4/2000 | Stewart et al. | |
| 6,334,778 B1 * | 1/2002 | Brown | 434/258 |
| 6,398,222 B1 | 6/2002 | Everett | |
| 7,207,804 B2 * | 4/2007 | Hersh | 434/236 |
| 7,676,372 B1 * | 3/2010 | Oba | 704/271 |
| 7,720,610 B2 | 5/2010 | Bergfalk et al. | |
| D635,190 S | 3/2011 | Merrill et al. | |
| 2008/0021351 A1 | 1/2008 | Teicher et al. | |
| 2008/0091474 A1 | 4/2008 | Ober et al. | |

(Continued)

FOREIGN PATENT DOCUMENTS

WO 2012064999 A1 5/2012

OTHER PUBLICATIONS

Sharlin et al."Spatial tangible user interfaces for cognitive assessment and training", Springer-Verlag Berlin Heidelberg, pp. 137-152, 2004.*

Primary Examiner — Robert J Utama
Assistant Examiner — Sadaruz Zaman
(74) Attorney, Agent, or Firm — Edward P. Heller, III

(57) ABSTRACT

A cognitive disorder diagnostic system that employs cognitive cubes, gameplay associate with the cognitive cubes, and a data gathering as statistical analysis base device that may be a computer, that communicates the gathered data to a web server host according to a unique ID associated with particular cognitive cubes and further associated with a particular player. Using the statistical data gathered using the gameplay, various cognitive disorders may be successfully diagnosed and treated with higher reliability.

4 Claims, 26 Drawing Sheets

(56) References Cited

U.S. PATENT DOCUMENTS

| | | |
|---|---|---|
| 2008/0280276 A1 | 11/2008 | Raber et al. |
| 2009/0273560 A1* | 11/2009 | Kalanithi et al. ............ 345/156 |
| 2010/0279258 A1 | 11/2010 | Cohen |
| 2011/0053134 A1* | 3/2011 | Jung et al. .................... 434/362 |
| 2011/0097996 A1 | 4/2011 | Kalanithi et al. |
| 2012/0169748 A1 | 7/2012 | Merrill et al. |
| 2012/0258436 A1 | 10/2012 | Lee |
| 2012/0270497 A1* | 10/2012 | Merrill et al. ................ 455/41.1 |

* cited by examiner

Play + CogCubed

Players Beta - Clinical

| | | | | | | |
|---|---|---|---|---|---|---|
| kinha | Groundskeeper | 82% | 22% | 18% | 36% | 68% |
| kroots | Roopets | - | 91% | 11% | 35% | - |
| rooster | Roopets | - | 55% | 92% | 65% | - |
| felix | Groundskeeper | 92% | 18% | 14% | 93% | 41% |
| yoyo | Groundskeeper | 75% | 8% | 12% | 27% | 94% |

Fig. 32

COGNITIVE ASSESSMENT AND TREATMENT PLATFORM UTILIZING A DISTRIBUTED TANGIBLE-GRAPHICAL USER INTERFACE DEVICE

The present application claims the benefit of U.S. provisional application Nos. 61/549, 698, filed Oct. 20, 2011, and 61/551,384, filed Oct. 25, 2011, which are hereby incorporated by reference in its entirety.

The present application incorporates the following references in their entirety:

ADHD/Attention
1. U.S. Pat. No. 5,913,310, June 1999
2. U.S. Pat. No. 5,940,801 Aug. 17, 1999
3. U.S. Pat. No. 5,377,100 Dec. 27, 1994
4. U.S. Pat. No. 5,913,310 Jun. 22, 1999
5. U.S. Pat. No. 6,053,739
6. Patent application: 2008/0021351
7. Patent application: 2010/0279258
8. U.S. Pat. No. 7,720,610

Autism:
9. U.S. Pat. No. 6,398,222

Sifteo:
1. Patent application: 2011/0097996
2. Patent application: 2012/0169748
3. US. Pat. No. D635190

BACKGROUND OF THE INVENTION

1. Field of the Invention

The invention relates to the field of cognitive disorders including assessing attention deficits and/or comorbidities, treating attention deficit hyperactivity disorder, and/or conditions with attentional impairment such as autism spectrum disorder (ASD), anxiety, depression, and epilepsy.

2. Background of the Art

Assessing and treating attention deficits, comorbidities and/or treating other conditions that have attention deficits have fundamentally been a challenge for parents, teachers, and health care providers. For example, there is no specific test for diagnosing attention deficits. Also, there is no aid for differentiating ADHD from conditions that have attentional deficits as a symptom of the disorder. This represents a challenging situation for educators and health care providers. Therefore, the following conditions can be comorbid with ADHD or they may manifest themselves with attentional deficits separately from the disorder.

Learning or language problems
Autism Spectrum Disorders (ASD)
Anxiety disorders
Mood Disorders
Psychotic Disorders
Seizure disorders
Traumatic brain injuries
Frontal lobe pathology
Vision or hearing problems
Sleep disorders
Dementias
Substance Use Disorders Gathering as much information as possible about the individual from disparate sources is currently the best way to diagnose and treat an individual's symptoms. For example, current diagnostic aids used in assessing ADHD are subjective, expensive, time intensive, and provide little information about accessory movements in response to a stimulus. These diagnostics aids make it difficult to identify ADHD, comorbidities, and/or other attentional related diagnoses.

Consider the typical diagnostic aids for ADHD which are reviewed by health care providers to help make a clinical diagnosis. Tests such as the Conners' Rating Scale require subjective responses from parents and teachers, making coordination difficult. The computerized Conners' Continuous Performance Test (CPT) provides objective data in regards to inattention and impulsive patterns of response. However, it does not provide data regarding accessory movements such as restlessness, hyperactivity, and other inappropriate movements. In addition, it does not give inter-response data. If the subject taking the exam has a reading disorder, it will impair his or her ability to respond accurately and it will increase response time. The T.O.V.A. is another computer based test used as a diagnostic aid for ADHD, which uses a microswitch to record responses. It does utilize auditory and visual stimuli, which removes the reading level limitation. However, it is unable to measure accessory and/or inter-response movements that may be contributing to reaction time and errors of omission and commission.

Upon properly establishing a diagnosis, it is then important to establish a course of treatment. This is vital in both schools and in the medical field. Attentional deficits greatly limit academic aptitude and long term potential leading to the development of some of the common comorbidities such as anxiety and depression. Addressing these symptoms at a young age are cruicial in decreasing these detrimental effects long term.

Medications and talk therapy dominate the treatment course of attentional deficits and overall there is limited availability of cognitive training interventions as a method of treating attentional limitations. Those that exist are frequently delivered on laptops, iPhones, or iPads, do not take into consideration the following because of the devices used:

Detailed behavioral pattern prior to and following response cannot be monitored.
Data collection only takes place on one device, instead of three or more.
Testing attention in response to various degrees of spatial differentiation is not possible.

The deficiency for data-driven methods which aid in diagnosing and treating these and other disorders, a need exists for a platform which that collects, stores, and analyzes data to reveal patterns in physical and cognitive behaviors.

Further, engaging those with ADHD, ASD and other conditions in their treatment is another barrier to recovery for which an evidence-based tool is necessary. Research shows that games appeal to this barrier and provide this engagement.

SUMMARY OF THE INVENTION

The invention solves many of these problems. It provides a platform that collects data that was previously unavailable in nature and in quantity. The platform captures response and inter-response movement patterns from each player. The system then combines this data with demographic information and analyzes it through to produce a profile that explains player behavior.

The novel data is produced by hands-on game interactions and responses. This platform which employs a gaming system improves engagement by taking advantage of psychological predisposition of humans to entertaining challenges triggered by visual and auditory stimulus. The techniques applied to this new type of data make it possible to evaluate and treat attention deficits and/or many of their comorbidities such as depression, anxiety, and ASD.

This platform employs a tangible-graphical user interface. One type of such device, illustrated in FIG. 1, is known as "Sifteo Cubes," a game platform made by Sifteo Inc. of San Francisco, Calif. Sifteo Cubes are motion-sensitive wireless blocks, which contain multiple sensors and variable displays. They can interact with each other on all four sides. They can be manipulated by hand.

Because of the features of such devices, this game system allows for a third dimension to be studied, a limitation of traditional hardware devices. For example, computers cannot indicate what the participant is doing between disturbances. In contrast, these devices can offer clues about movement in the tilting, pressing, and neighboring actions. This is at a very granular level, because each device has an accelerometer. Further, the gaming platform is designed to capture data at a sub-second second interval. Additionally, while an iPad might offer clues about participant behavior between disturbances, the platform itself is less interactive because in-game interactions do not require tangible movements.

A further advantage of using this system is the insight into spatial attention capabilities. Neither computer-based tests nor the iPad can test auditory spatial attention and visual spatial attention. The innovative platform we have designed captures this type of data, creating a more robust tool. Some other advantages of this platform versus existing technology like iPad/iTouch/iPhone include:

Behavioral pattern prior to and following response can be monitored.
Eliminates affect of reading disability on reaction time and patterns of response.
Multiple devices allows for granular data to be gathered during test session.
Platform provides auditory patterns of response.
Testing for auditory spatial attention and visual spatial attention.

The platform is broadly useful for gathering data that is useful for diagnosing and treating issues in all cognitive areas. One embodiment, called Groundskeeper, is specifically designed as a diagnostic aid and cognitive improvement tool, which allows for treatment focused on executive functioning, like ADHD, for children and adolescence. In this game, four interactive devices or sensors are used. At any given time a gopher, groundskeeper or empty field will appear on the devices in randomized frequencies. See FIG. 2. During specific levels, greater auditory and visual distracters are added. A rabbit and/or birds appear during these levels to increase distracters. Bird chirping sounds are also varied to one bird or several birds. The participant is asked to respond as quickly as possible by hitting the mallet (the fourth device) to the device exhibiting a gopher. The participant is instructed to only hit the device once and a sound will be heard indicating they have hit the gopher as intended. The instructed arrangement for the basic levels of the game on the devices to the participant is seen in FIG. 3. The participant is instructed to not respond to other stimuli, do any other movements with the device or hit the stimulus device more than once.

This game or test is designed to test several domains of attention by including a combination of multi-task approaches while monitoring behavior prior and following a response by analyzing the degree of movement of the devices as difficulty of the game increases including adding a spatial disturbance in the later stages of the game. In addition to providing diagnostics for executive functioning deficits, this tool can treat these deficits by analyzing the pattern of manipulation of the tangible-graphical device using game based applications, giving instant feedback to fine tune their abilities. This feedback, over time, is a behavioral based intervention that can improve attentional capabilities as a measure of executive functioning without requiring medications. It can also monitor medication treatment effects over time.

Another game is called Roopets. See, FIG. 4. This game, is useful for intervention purposes in ASD. It is designed to be used with three or more tangible devices. One device sits in the pocket of a toy caterpillar while two or more players each receive a device. The goal of the game is to have a leader and a follower, where the leader will move the caterpillar in a series of actions over a set period, and then have the follower do the same movements. This allows the game to capture a data difference based on movements of the devices embedded in the caterpillar and the follower, i.e., between the leader and follower. This data is used as a feedback mechanism for behavioral patterns common in social deficits like ASD. This disorder causes the temporal gyrus, a location in the brain, to be deficient in visual processing, which is process crucial for successful social interactions. To improve the function of this area of the brain, which research has shown can be improved by principals of neuroplasticity similar to a muscle improving function through exercise, requires detailed tracking of responses from someone with the condition. The activity requires the therapist, teacher, or leader in this case to provide auditory, but primarily physical instructions through movement, which the patient or player will interpret and attempt to mimic. This comprehension by the temporal gyrus will manifest itself by player responses and will exhibit its progress by tracking this movement over a period of time, thus allowing the patient or player to mimic the movement. With the data from the game providing feedback, the leader can guide the patient with ASD to fine tune their physical movements in conjunction with improving their visual processing of movements.

Physically active games influence dopamine and norepinephrine, chemicals in the brain that regulate attention, mood, memory and learning. Our game Roopets Racing is useful because it boosts physical activity thereby increasing these chemicals, providing a natural treatment for disorders with attention deficits, mood disorders, anxiety disorders, among others affected by dopamine and/or norepinephrine imbalance.

Data is captured real time in response to game play and stored. Thereafter, the captured data is parsed and accumulated using inventive algorithms into predictive data that can be used by a practitioner in diagnosing or treating cognitive disorders.

BRIEF DESCRIPTION OF THE DRAWINGS

FIG. 32 illustrates exemplary results of cognitive disorder like ADHD, ASD, anxiety, or depression.

DETAILED SPECIFICATION

Each game on the device collects player data and is synchronized and stored on a host or server computer. From this system, data is aggregated with demographic, educational, and medical data and then analyzed to explain player behavior. The results are displayed on a user interface, like a mobile phone or web browser. This platform can be applied to any tangible-graphical user interface that utilizes multiple interactive devices or sensors.

Figure 5:
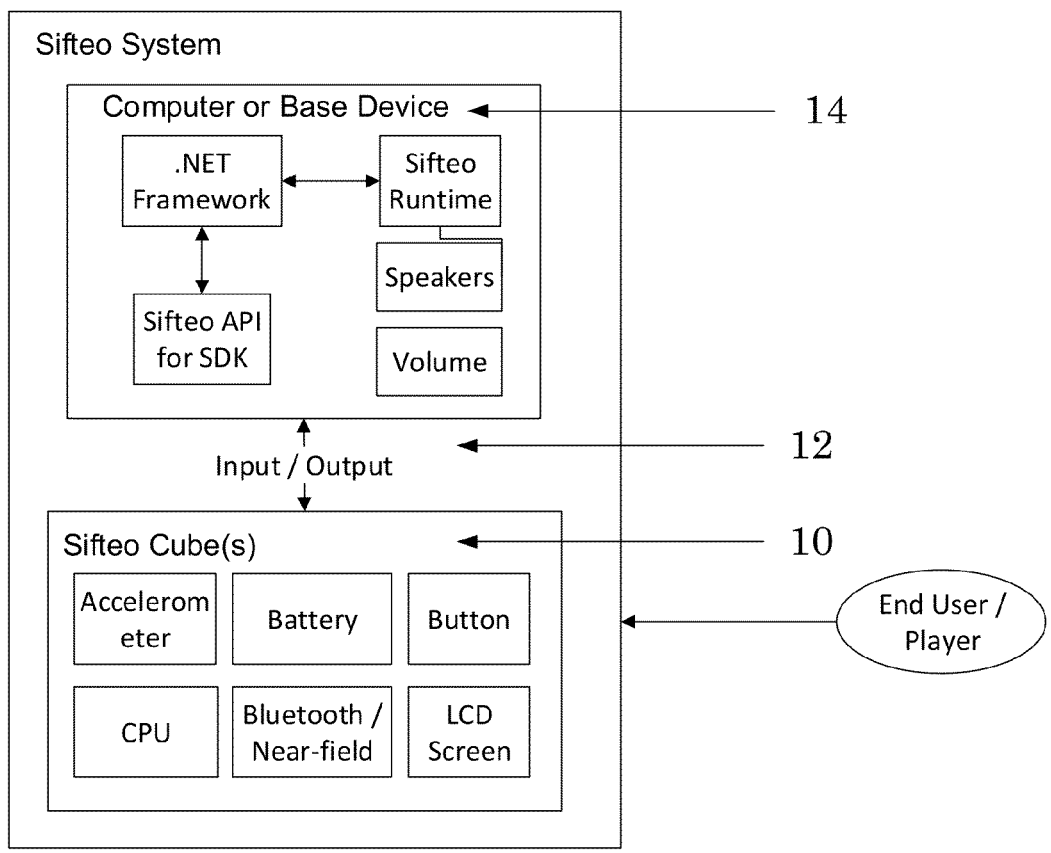
FIG. 5 illustrates an overview of the game platform.

In a first embodiment, see FIG. 5, Sifteo Cubes 10 link wirelessly 12 to a base device 14 that acts as a computer. This device can be a computer or specialized firmware provided by Sifteo, which is called the Sifteo Base. In either case, games are written using with the Sifteo SDK, which supports C++, Python, or C# programming languages. The games are written, compiled, and then executed by this base device or the computer. Portions of the game, which can be images from the game, are loaded onto the Sifteo Cubes before the game is played. The computer or base device is responsible for acting as the master node of this distributed system which may involve several cubes. As the master nodes, it controls the coordination of the game and it serves as the landing area for any game data received during play from the player. The Sifteo system is outlined in FIG. 5. See the following Sifteo patents for more details about the Sifteo Cube system. application Ser. Nos. 12/909,690, 13/341,780, and US. Pat. No. D635190.

Figure 6:
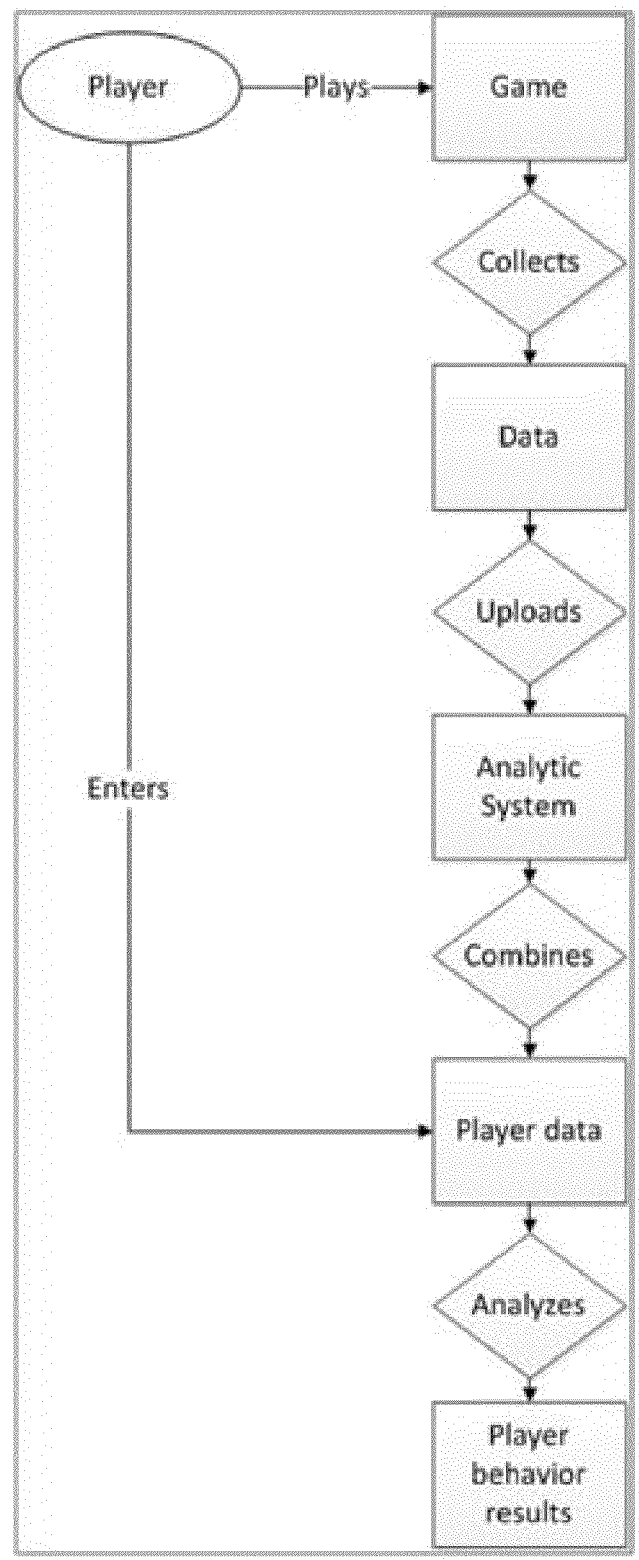
FIG. 6 illustrates the interaction of the player with the game in a first embodiment.

The data flow for data collection and storage of the platform is defined in FIG. 6. As described, the games collect player data, the data is uploaded to host or server computer, the data is combined with player demographic information, and then the data is analyzed to provide a player profile of behavior.

Figure 7:
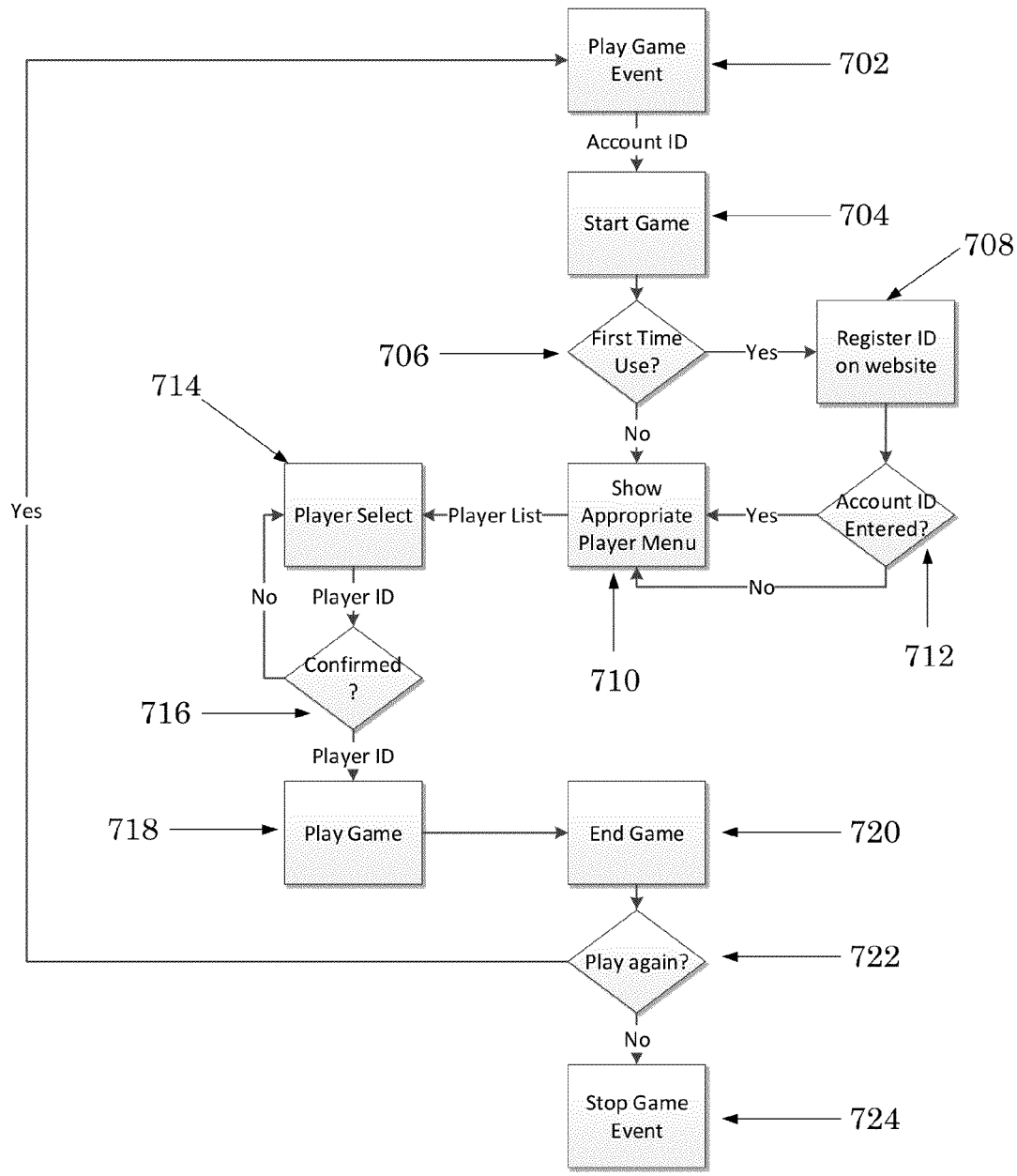
FIG. 7 illustrates the overall data flow for a game, a component of the broader platform.

FIG. 7 illustrates the overall data flow for a game, a component of the broader platform. Data flows through each game following control from a state machine. Upon starting 704, the Sifteo account holder is asked to register 708 the devices with CogCubed, a website, through the web if they have not done so before 706. Once complete 712, the relevant player lists for that account holder are shown on the device 710. If they do not register, a default player list is shown to the device 714. The player or players are asked their name to start the game 716. The game is then played and data is collected 718. At the end of the game 720, the player or players can play again 722 or stop 724.

Figure 8:
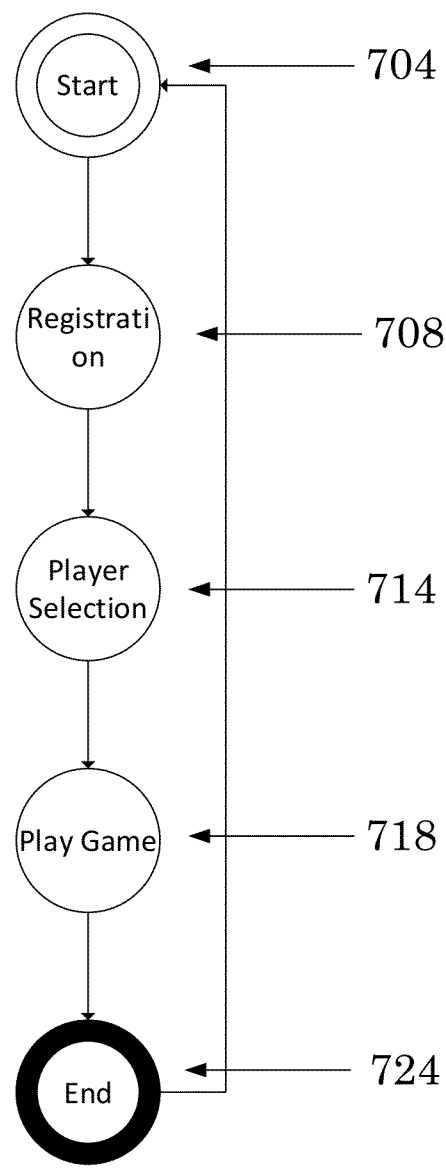
FIG. 8 illustrates the various states of a state machine that control a game.

FIG. 8 illustrates the data flows based on different transitions in the game from starting the game 704, to account holder registration 708, to player selection 714, to playing the game 718, to ending the game 724. These are all events that are controlled logically by the state machine controller interface available in the Sifteo SDK. Each state executes until the logic of the game advances the state, whether that logic is initiated by a human or by the computer. This is a standard interface utility in the Sifteo SDK, which is used to control game states. Games are designed for tangible graphical systems like the Sifteo Cubes.

In more detail, the player starts a game by loading or installing a particular game onto the computer or base device 702. This follows the Sifteo game installation instructions. The player then starts the game by initiating the Sifteo runtime library which also resides on the computer or base device. 702 This will cause the computer or base device to begin executing the game executable, which are written in C++,C#, or Python and are based on the specifications available from the Sifteo SDK. By executing the game, the state machine starts and the first state, e.g., 706, starts.

Figure 9:
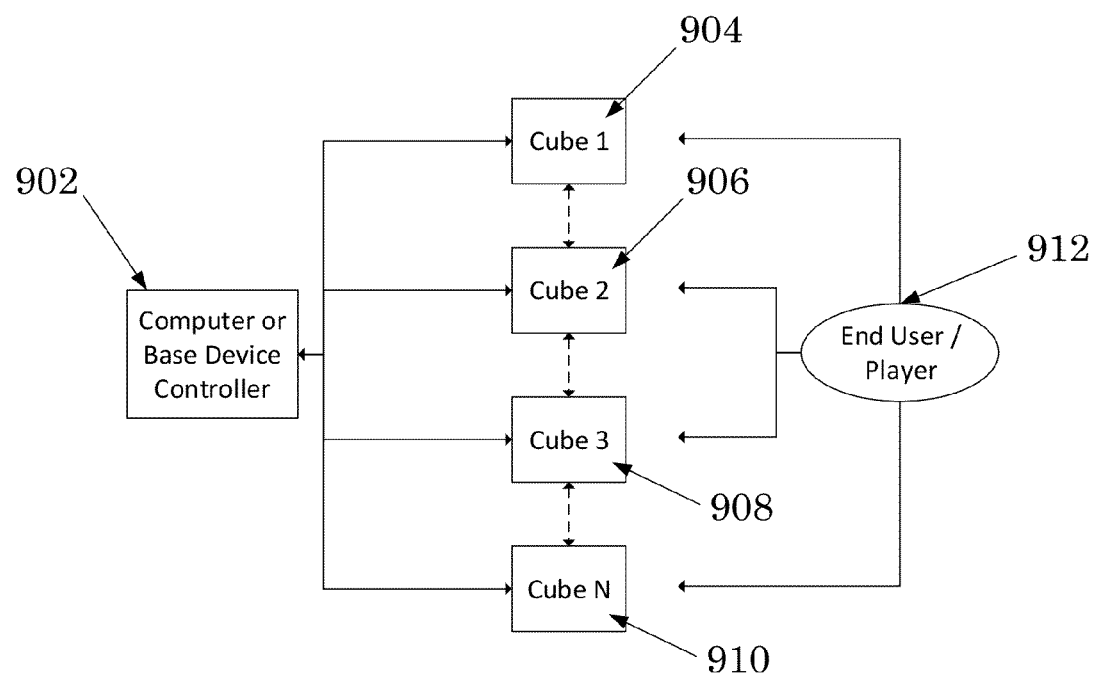
FIG. 9 illustrates the base device in wireless communication with four cubes.

In reference to FIG. 9, the computer or base device 902 communicates wirelessly with one or more cubes 904-910 by executing said program. Each cube displays graphics. The base device 902 plays music in the background from the computer or base device, which signals that the game has started. Communication occurs bidirectionally. Each cube sends or receives signals from the computer or base device and also with each other.

Figure 1:
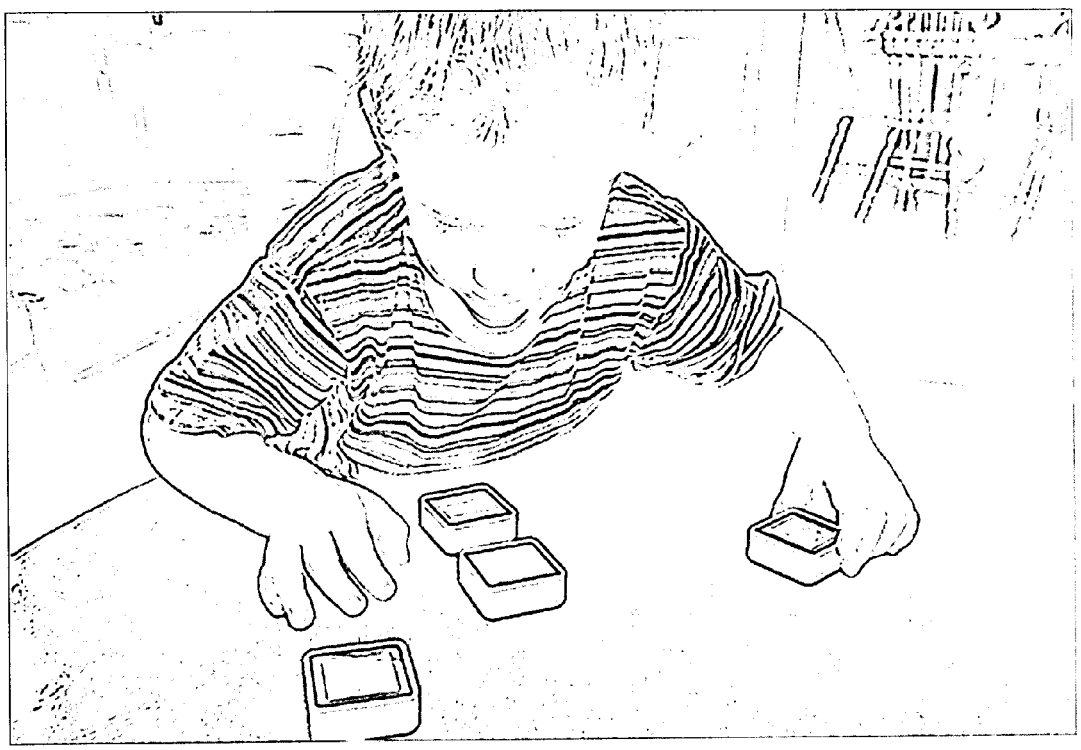
FIG. 1 illustrates a child manipulating four cubes of the first embodiment.
Figure 2:
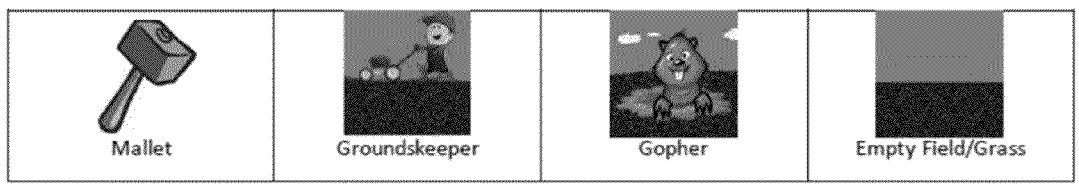
FIG. 2 illustrates the graphic displayed on the four cubes of the first embodiment.
Figure 3:
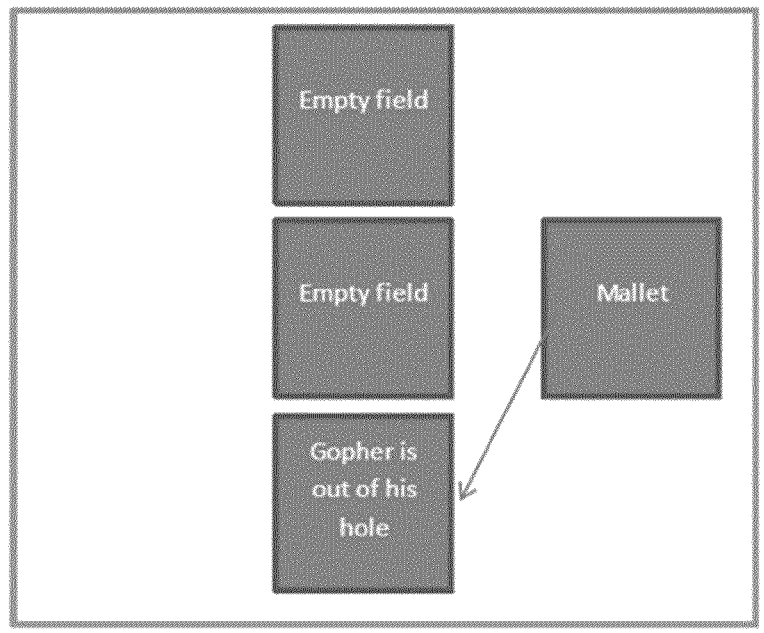
FIG. 3 illustrates the use of the mallet in the first embodiment. The player must use the mallet to strike the cube illustrating the gopher.

FIG. 1 depicts a child playing a CogCubed game with the cubes from the Sifteo Cube system graphically represented in FIG. 9. One example of the pictures that may be depicted on the is shown in FIG. 2.

Figure 10:
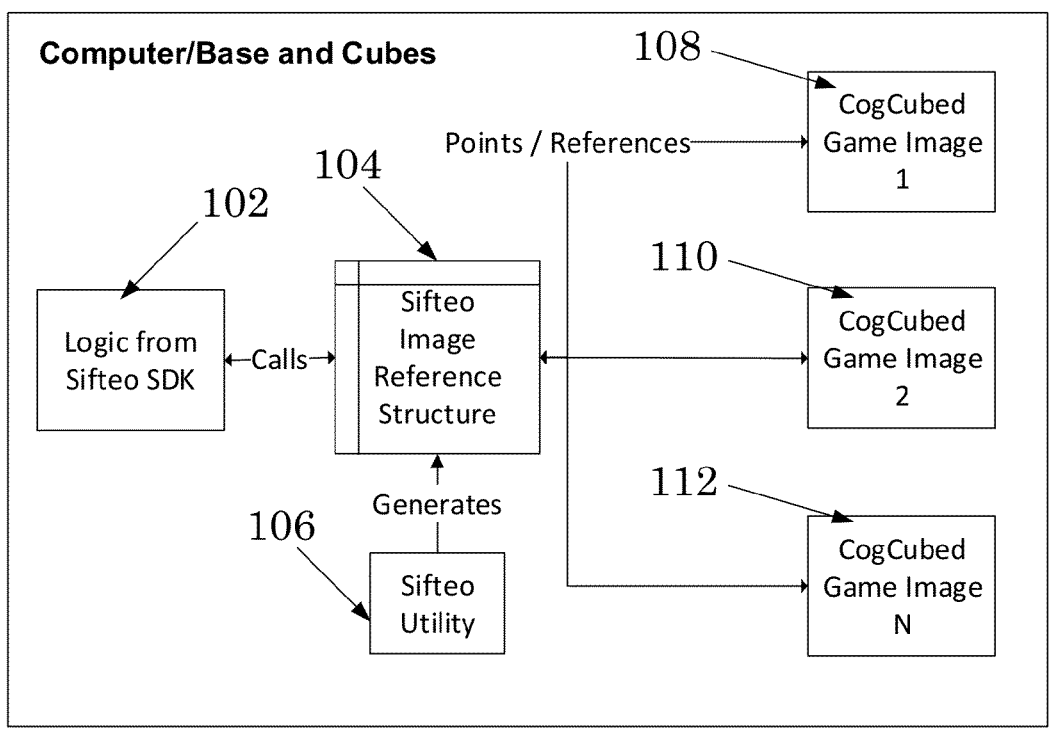
FIG. 10 illustrates the mechanism that the Sifteo Cubes uses to display graphics.

FIG. 10 is an overview of the mechanism that the Sifteo Cubes utilizes to display graphics. The games graphic images 108, 110, 112 are displayed on the cubes by using logic and structures available in the Sifteo SDK 102. This logic requires putting game graphics into an image index or structure 104 by using a Sifteo Utility 106 for image bundling. The images referenced by the Sifteo structure reside in a directory which is accessible by the game system. The logic within the game program then uses C# or C++ code to call functions available in the Sifteo SDK to reference this structure which points to the images used by the game. The Original Sifteo Cubes employ the use of C# in the Sifteo SDK while the new version of the Sifteo Cubes use C++ in the Sifteo SDK.

Figure 11:
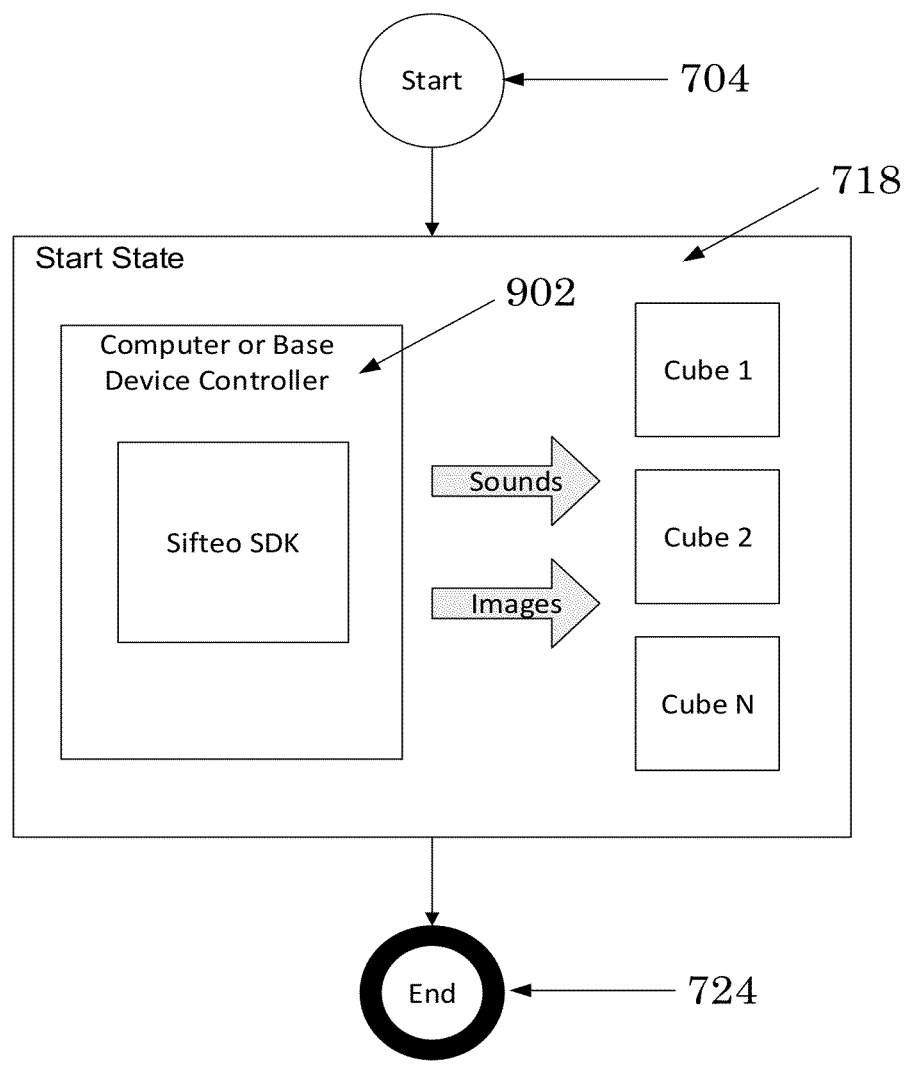
FIG. 11 shows sounds and images being pushed from the base station to the cubes.

In reference to FIG. 11, the game starts 704 and a start event 718 in the state machine begins. Graphics defined in said structure are displayed on the cubes using said logic from the Sifteo SDK. Audio files in the format of WAV or MP3 files are also played during this event in the game. These files, which are referenced by the game system, are played, stopped, or looped in the game by referencing the sound utility in the Sifteo SDK. Unlike images, these audio files do not need to be bundled together in an index or data structure. This is part of the Sifteo SDK.

Figure 12:
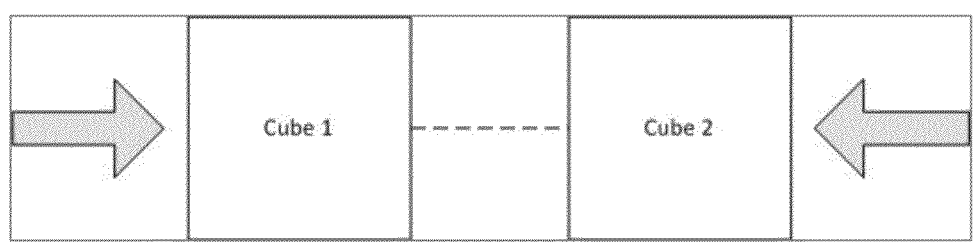
FIG. 12 illustrates the neighboring of two cubes.

In reference to FIG. 12, the cubes are physically neighbored by a user. This neighboring can be used to advance the game state machine seen in FIG. 8. The Sifteo SDK provides a neighboring event handler. It may be used to logically change the state in the game.

Figure 13:
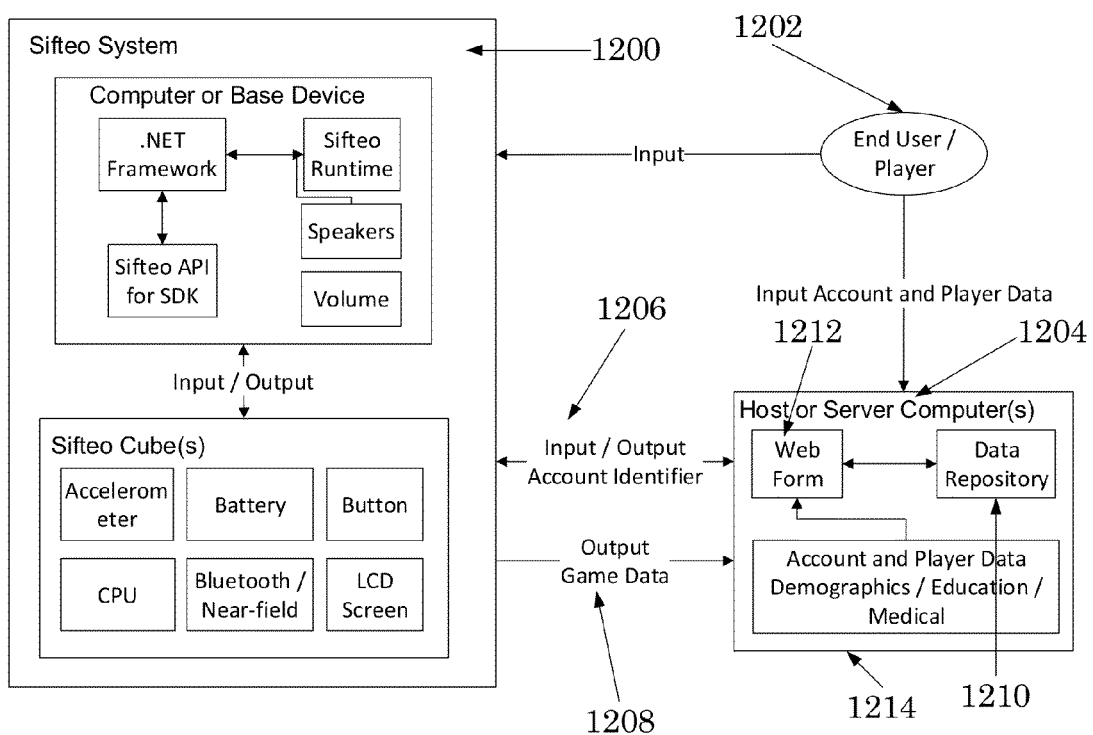
FIG. 13 illustrates the game platform in communication with an online database system.

In one embodiment illustrate in FIG. 13, advancing the state machine from the start state to the registration state that links 1206 to a player's account online, hosted on a host 1204 or server computer(s), to the Sifteo Cube system 1200. This link is based on a key (not shown) that exists on both the cubes and the host or server computer systems. This key is necessary to link (on output 1208) the physical actions of players from the game cubes to information about each player, such as demographics, education, and medical history.

This link is made through a generated key identified on the cubes and that is associated thereafter with the particular set of cubes that the account holder 1202 for the particular cubes must then register online. Logic from the cubes will lookup this key on the host or server computer to return all player names associated with the account holder back to the cube.

Figure 14:
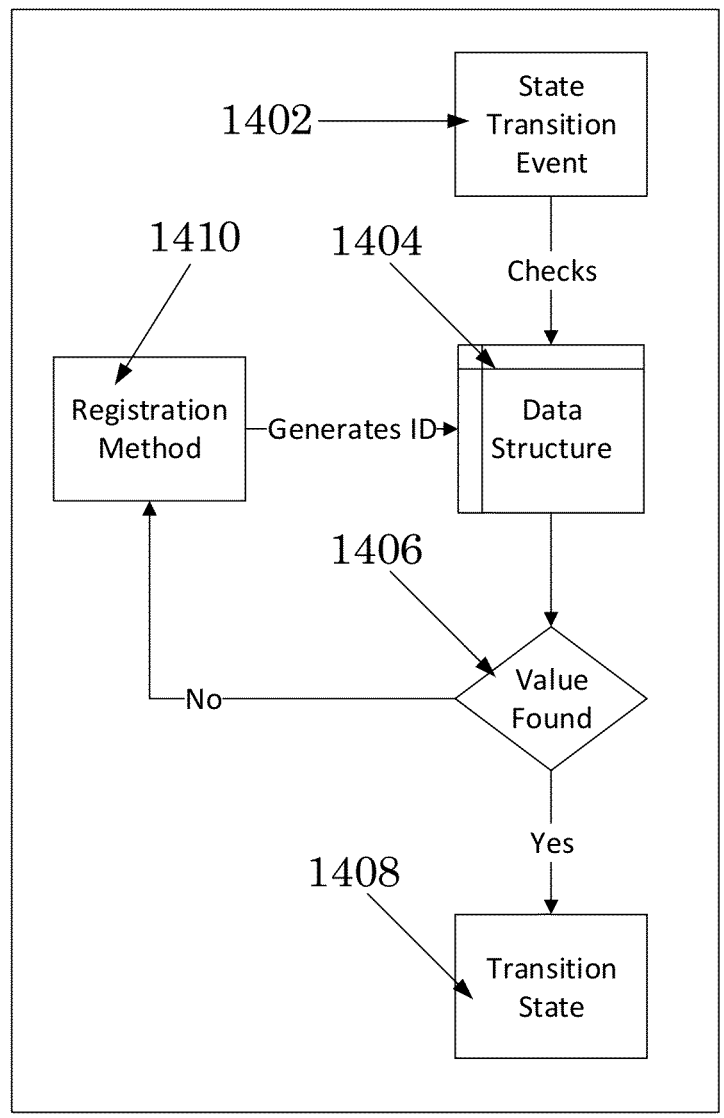
FIG. 14 illustrates process that determines if registration has taken place before.

Logic within the registration state first employs an algorithm that determines that checks a special data structure, represented by the Sifteo data class in the Sifteo SDK, to see if registration has happened before. This special data store uses nonvolatile storage and persists when games are stopped and the system is turned off. This algorithm process is seen in FIG. 14.

Figure 15:
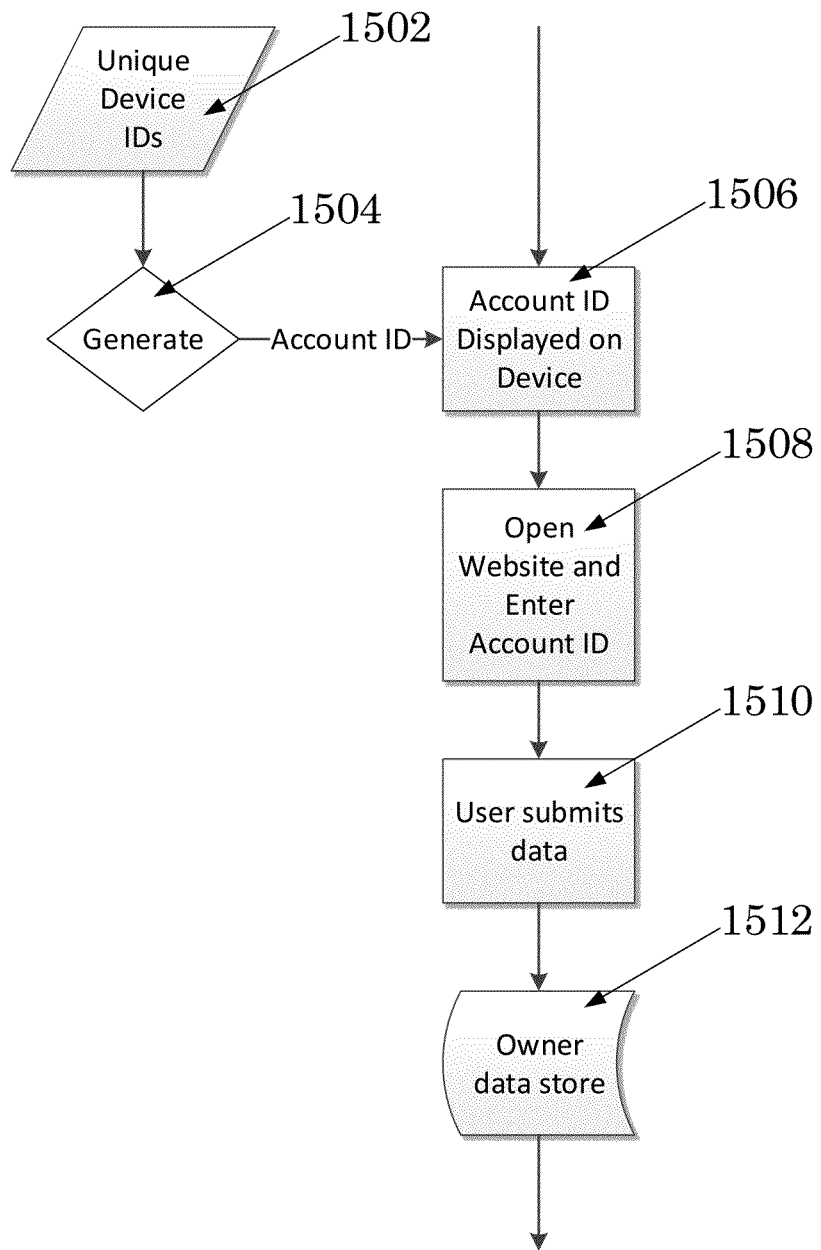
FIG. 15 illustrates a registration process.

A data store structure 1404, part of the Sifteo SDK, is checked for a unique account identifier which signals registration. If any identifier is found, the state transitions to the player state. If no identification is found in the nonvolatile data structure, a different algorithm 1410, detailed in FIG. 15, is initiated to generate an identifier which is displayed on the cube and used for account registration. The registration process 1410 occurs if the cube account holder has not registered their device on the web.

Referencing FIG. 15, the game platform uses a unique device ID 1502 (see below for more) associated with particular cubes to generate 1504 an account ID which comprises the aforementioned key. The game platform instructs the player to open a web browser 1508, enter 1510 the numeric registration code (account ID) displayed on the game cube 1506, and submit this data, the account ID or registration code, to the host or server computers data store 1512.

If the cube account holder has registered these cubes before, the algorithm will find an identifier value (key, account ID, registration code) in this data store. This will then trigger the state machine to advance from registration to the player state for player selection. The logic executed by the algorithm is seen in FIG. 14.

Figure 16:
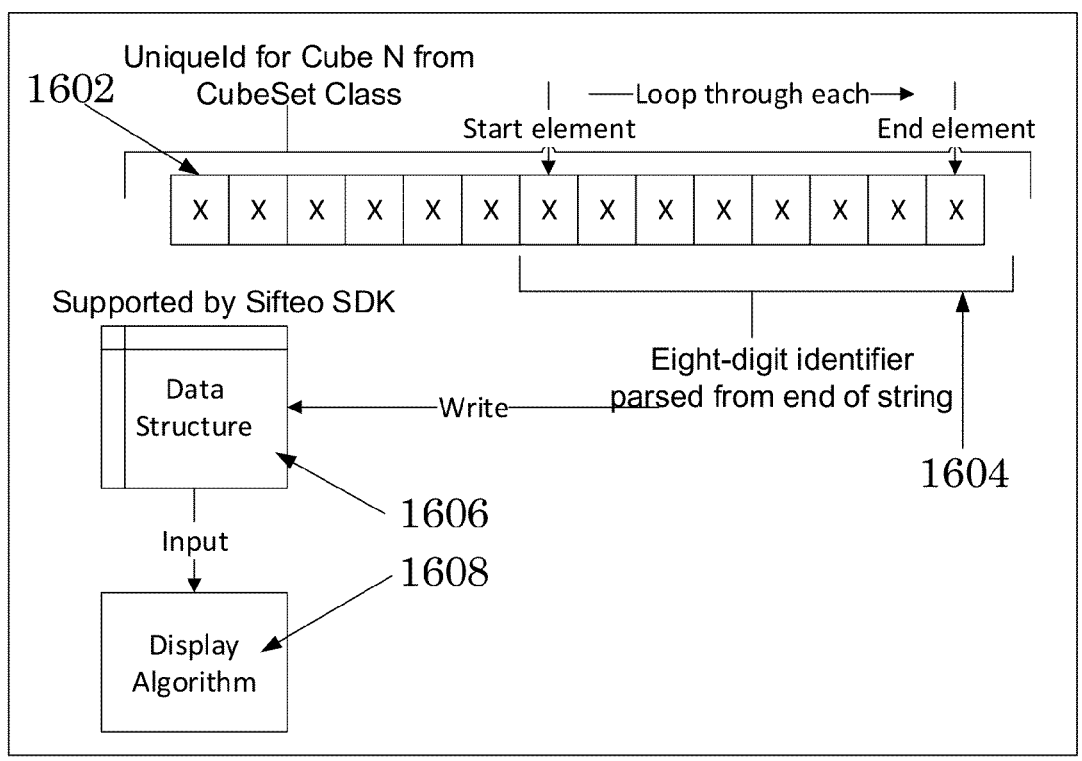
FIG. 16 illustrates process for generating a registration code from the unique cube number.

If the logic in the registration state does not find an identifier value indicating a previous registration, a different algorithm, illustrated in FIG. 16, generates a unique numeric identifier produced from one of the devices. Each cube from Sifteo is shipped with a unique hardcoded identifier 1602 that can be read programmatically through the Sifteo SDK. This algorithm, illustrated in FIG. 17, uses C# code to parse 1604 the last several digits of the identifier from each cube to create a unique key that ultimately links the physical cubes to a players account. The process from generation 1604, storage 1606, and display 1608 of the unique identifier is illustrated in FIG. 16. The display, illustrated in FIG. 18, instructs the user to register the registration code (unique identifier) at the registration website.

The said identifier (1604) is saved to the special data structure 1606 represented in the Sifteo data class from the Sifteo SDK. This identifier is written to this structure by using a C# method from the Sifteo SDK. The logic ensures this identifier will only be written if the data structure is empty.

Figure 17:
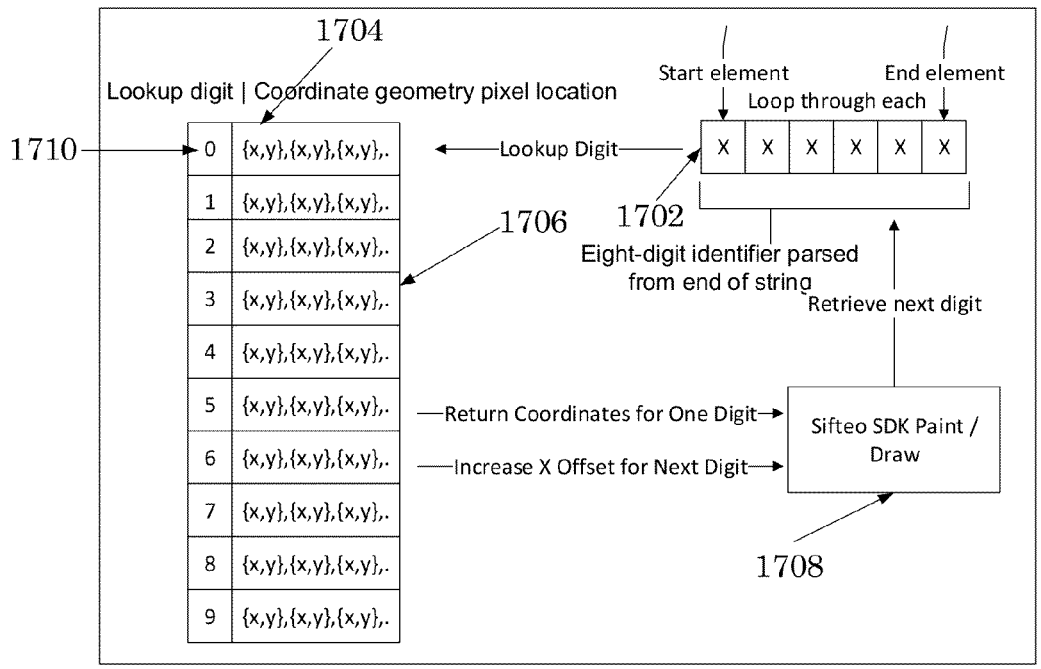
FIG. 17 illustrates the process for displaying the registration code on the cubes.

Referring to FIG. 17, the unique identifier parsed 1702 from just one randomly selected cube is displayed on a cube screen using another algorithm, which writes the digits of the identifier to the display of one device. Using C#, a single cube is randomly selected from N potential cubes by using standard randomization logic. The string identifier is then converted to an 8 digit decimal integer. The algorithm loops through each decimal digit of the integer, from beginning to end, matching 1710 the integer value to column 1 of a 2 dimension array 1704. Within the lookup array, column 1 contains a digit while column 2, 1706, contains the coordinate geometry location of each pixel necessary to create that digit on a screen. Upon matching to the integer in column 1, the algorithm will retrieve the coordinates in column 2, which the algorithm inputs into the Sifteo class in the SDK responsible for displaying pixels. The pixels relating to the matched integer will be written to the cube and an X-axis offset will be added as padding for the next digit, if it exists. The novel algorithm loops through all digits, performing this logic, until they all have been written to the cube display.

Figure 18:
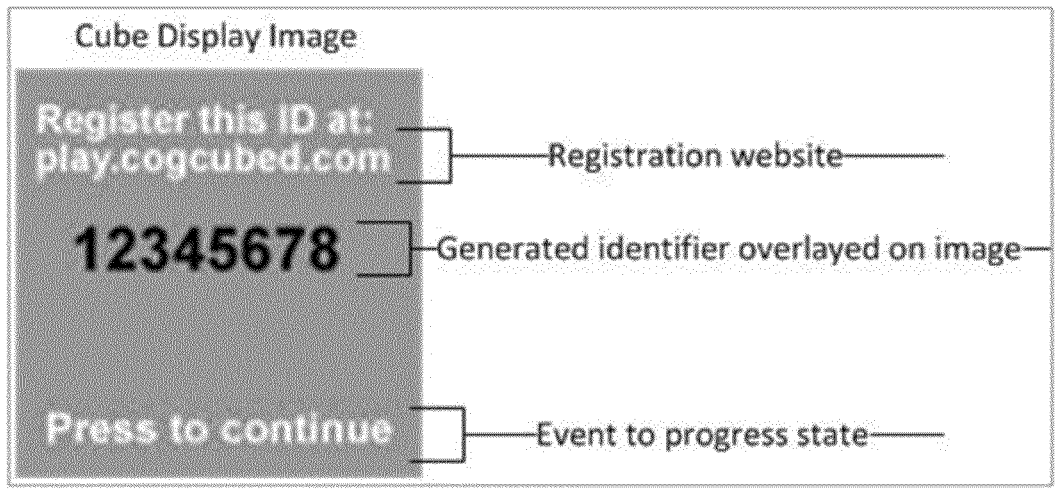
FIG. 18 illustrates the display of the registration code on a cube.

Referring to FIG. 18, the account holder is prompted to register this identifier on the CogCubed website.

Figure 19:
FIG. 19 illustrates a website registration form to register an account holder with a linking identifier.
Figure 20:
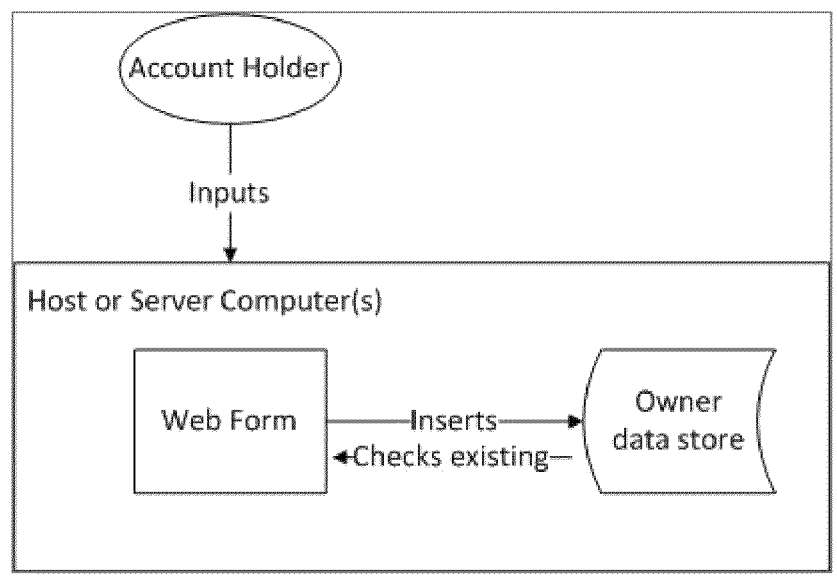
FIG. 20 illustrates the procedure for communicating between an account holder and a web server application using a web registration form that checks to determine whether a particular "owner" has previously registered.

On the registration website, seen in FIG. 19, the player is asked to provide this identifier and additional details related to their account. When submitted, this web form writes this data regarding the account holder of the cubes to a host or server data repository by using standard web form technology. Referring to FIG. 20, the web form is programmed to use server-side validation to check to ensure that account has not already been created.

The game platform prompts the account holder to press down on the cube to complete registration and advance the state. Physically pressing this cube down, which is logically handled through the Sifteo SDK event handlers, transitions the state machine from registration 708 to player selection 718. FIGS. 7 and 8.

Figure 21:
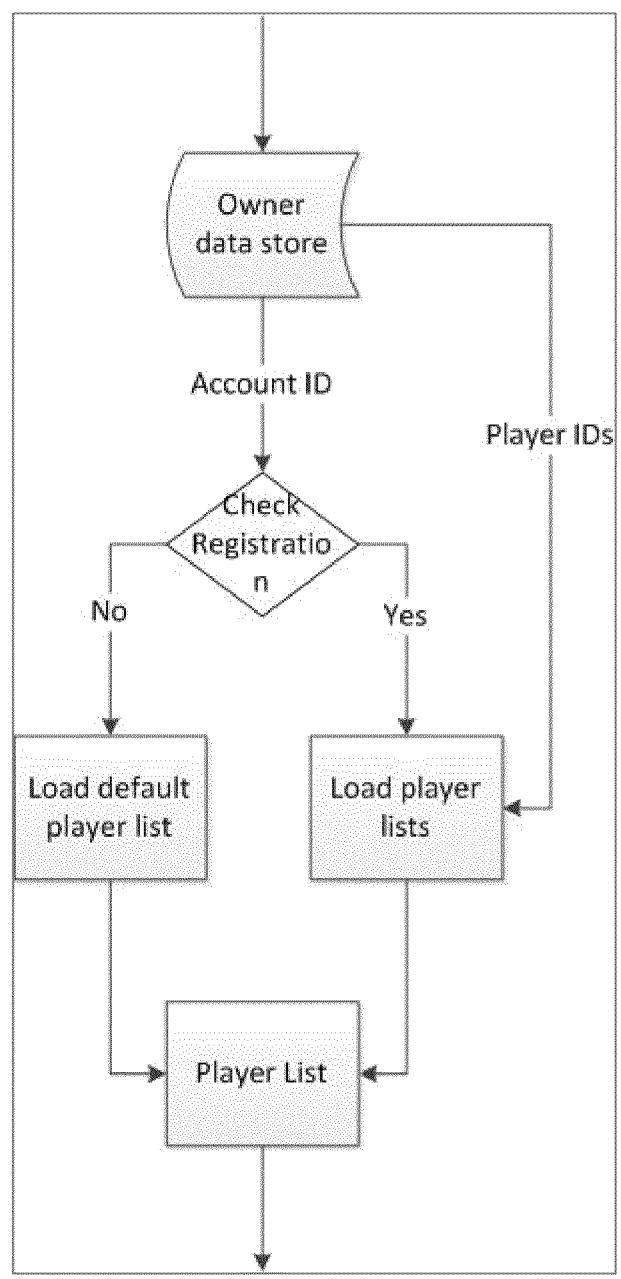
FIG. 21 illustrates the procedure whereby a base device receives from a Web server owner-data-store a list of players unique to the owner of a particular set of cognitive cubes.
Figure 22:
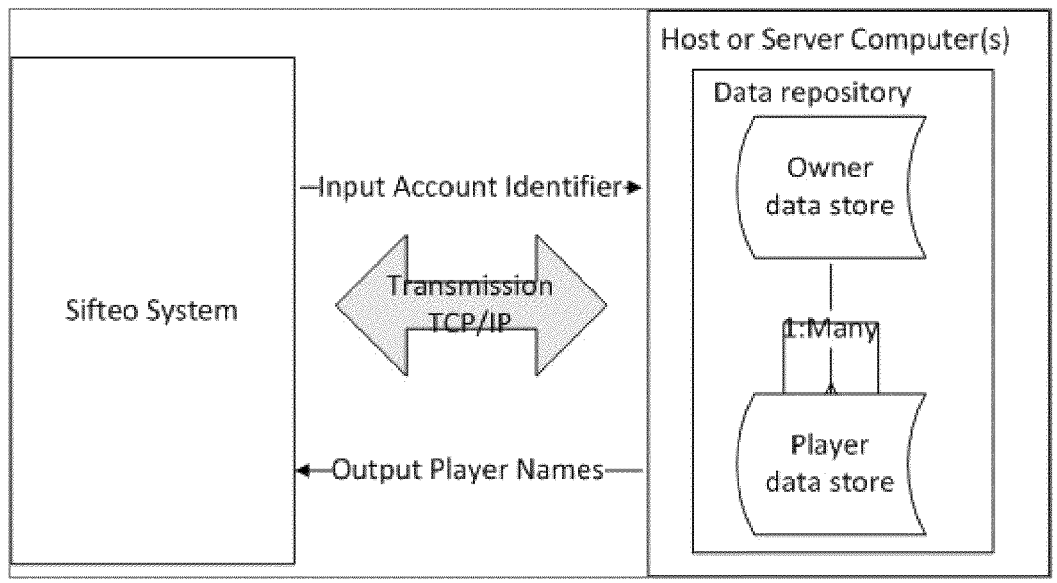
FIG. 22 illustrates a system perspective of player lookup based on registration identifier of owner and player data from a web host or server.

Referencing FIGS. 21 and 22, one or many players can be added to an account by using a web form on the host or server computers. The web form inserts player data, such as demographics, education, and medical history using standard web technology. This data is linked to the account identifier and allows for combining game date to detailed player data.

Figure 23:
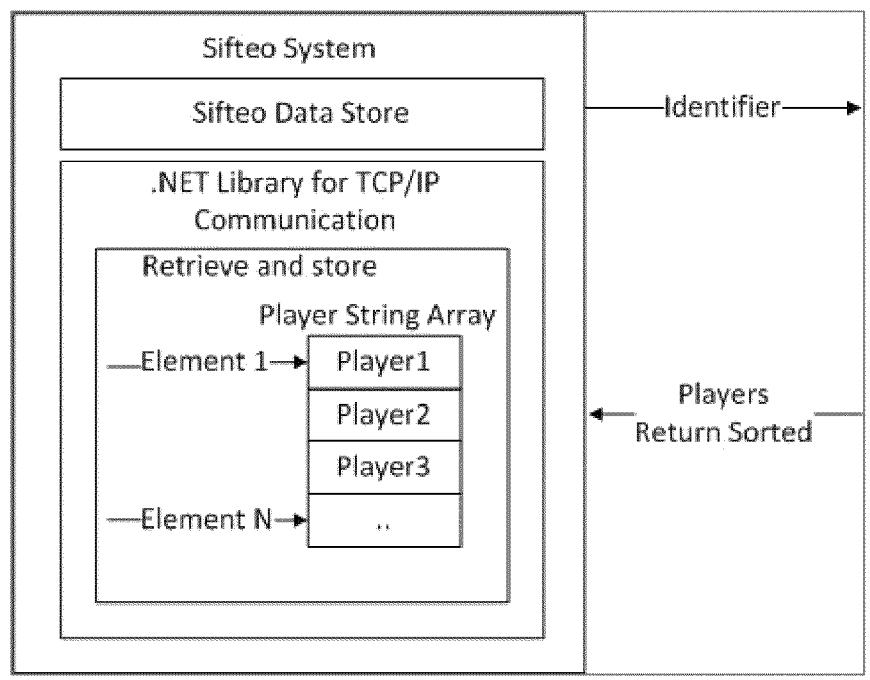
FIG. 23 illustrates the base device procedure for retrieving player data and storing player data in an array in response to the communication of a unique identifier to a web-based server.

Referencing FIGS. 21, 22 and 23, advancing the state machine from registration to player selection triggers the retrieval and display player lists for selection by the user or player. (The player lists are associated with the set of cubes via the unique ID or key.) This is performed through the following method, where the overall process is seen in FIG. 22.

The unique cube identifier, stored in the data structure represented by the Sifteo data class from the Sifteo SDK, is used to look-up player data from a host or server data repository containing user or player data. This retrieval process uses C# code and libraries supported by the .NET Framework, which is separate, but interoperable with the Sifteo SDK. In the new version of the Sifteo SDK, C++ libraries could be used to accomplish the same task. The Web server uses the numeric identifier associated with a set of cubes (account) as a filter or predicate clause in a query to select and return player details to the game cube from this repository. If the unique identifier matches an identifier registered online from the web form, the query retrieves all players associated with that specific account. The player list is sorted alphabetically during this retrieval from A to Z. These player names or handles, which are represented as character strings, are returned from the query and written to a string array in memory within the game. One player is assigned to each element of an N element array. The array will automatically size itself based on the number of players returned. See FIG. 23.

If there is no match, indicating no registration or improper registration, a default male and female player name list is returned to the array. The special Sifteo SDK data store is also reset to NULL or empty, so that registration is prompted on next use.

Figure 24:
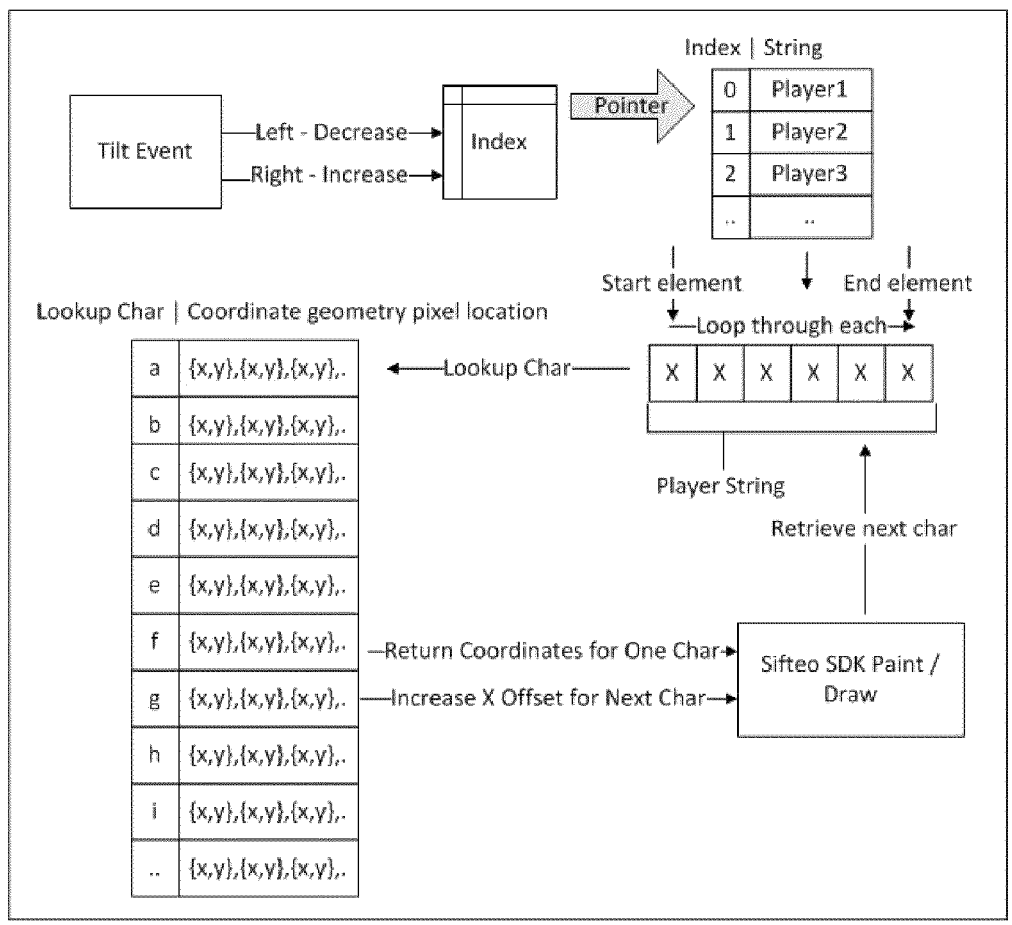
FIG. 24 illustrates a method of using cognitive cubes to and display the player's name on a set of cubes.

Referencing FIG. 24, the player names are logically be accessed in the player array by physically tilting a cube to the left or to the right. This movement initiates a tilting event handler, which is supported by the Sifteo SDK. This handler logic triggers a novel algorithm that changes the pointer location in the array to reference a higher or lower order element assigned to an index. When the index location changes, the algorithm points to the new array location, loads the location contents which is a player name, and then writes out each letter of the player to spell the player name. If a cube is physically tilted left, the algorithm decreases the array pointer by 1 if it is greater than −1. This prevents the program from going out of bounds in the array. Physically tilting the device to the right results in incrementing the pointer value by 1.

Based on the location of the pointer in the array, the algorithm loops through each character of the player name from left to right, matching the character value to column 1 of a 2 column array. Within the lookup array, column 1 contains a character while column two contains the coordinate geometry location of each pixel necessary to create that character on a screen. Upon matching to the character in column 1, the algorithm retrieves the coordinates in column 2, which the algorithm inputs into the Sifteo class in the SDK responsible for displaying pixels. The pixels relating to the matched character are written to the cube and an X-axis offset will be added as padding for the next digit, if it exists. The algorithm loops through all characters of the player name, performing this logic, until they all have been written to the cube display.

Figure 25:
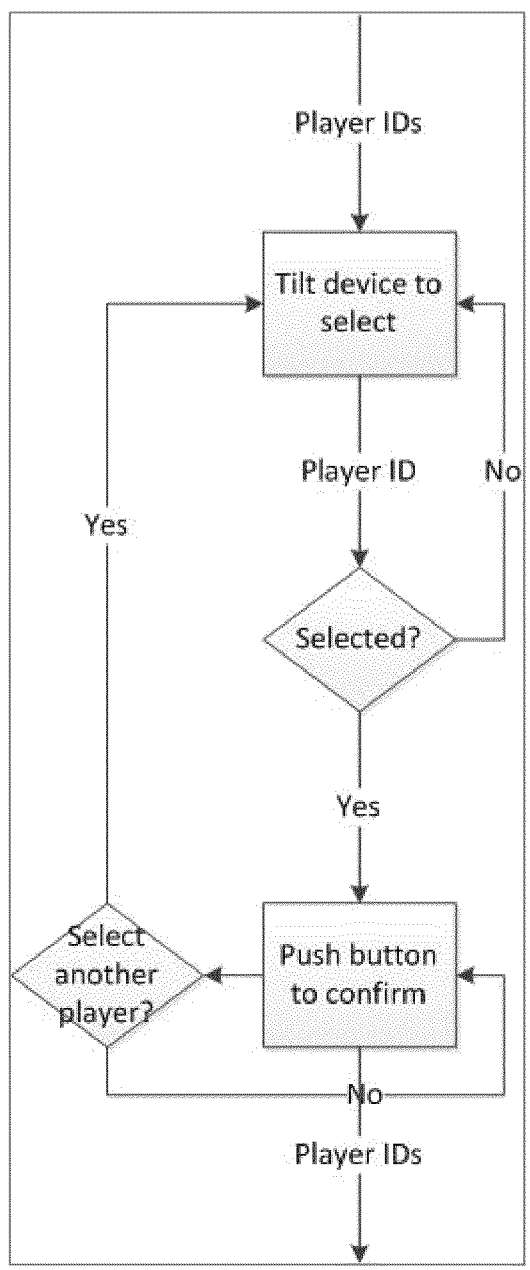
FIG. 25 illustrates the overall process of players selection using a cognitive cubes.

Referencing FIG. 25, the player is instructed to tilt the device to control player selection. Each tilt to the right causes a new player to be displayed on the device. When the player advances the player list to the desired player, they are instructed to push the device down.

Figures 26, 27:
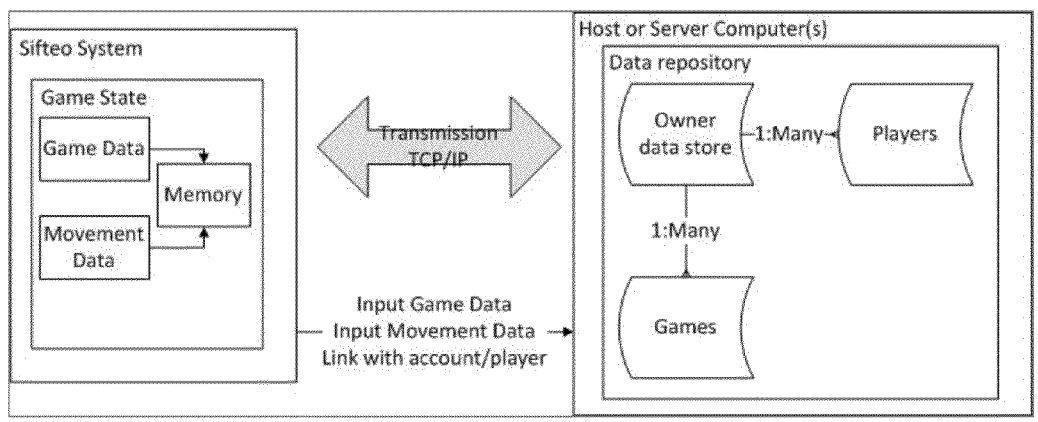
FIG. 26 illustrates a form that may be displayed on a web-based server whereby an account holder or owner may add players to their account at any time. The form illustrates the kind of data that may be entered and/or reported.
FIG. 27 illustrates the process for collecting game data into memory in communicating that game data to the web server are host or storage therein according to the owner data store and for the player associated with the particular game that was just played.

The player has the option to select one or more players for multi-player games by repeating said selection process. Physically pushing the cube down is handled by a Sifteo SDK event handler. This causes the player selected to be saved to an array. Pushing the cube down twice consecutively without selecting a new player causes the state machine to advance from player selection to game start. The game state starts and the state machine stays in this state while the game is being played by each player. FIG. 26 illustrates the kinds of data fields that might be associated with each player.

Referring to FIG. 27, the game is played and data captured. Game data comprises subsequent physical responses from cube movement. The data is captured into memory, which is transferred to a host or server computer data repository at the end of the game state. This data repository is linked to other player data via the registration and player link.

Figure 28:
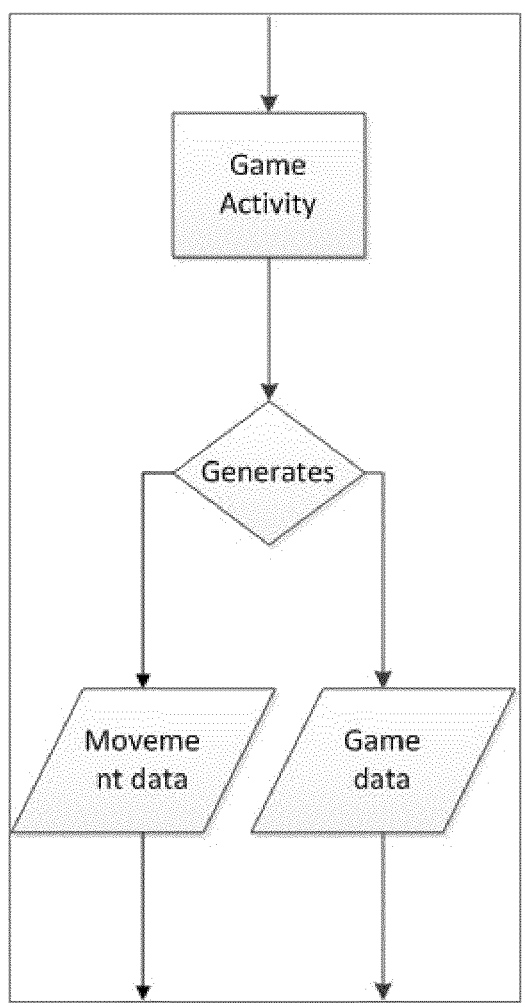
FIG. 28 illustrates the data flow for game logic generating game data and movement data.
Figure 29:
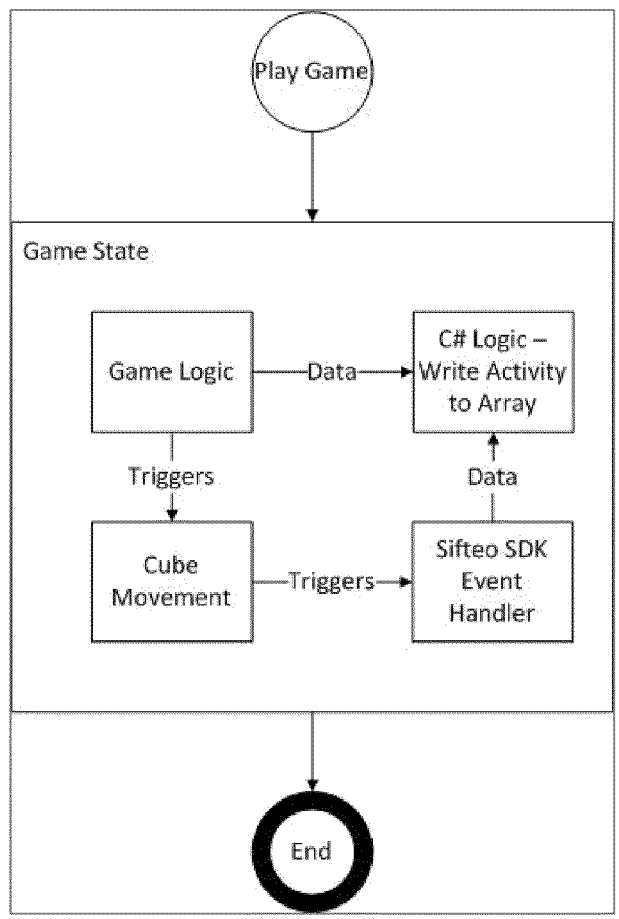
FIG. 29 illustrates a game state machine that iterates and sub $2^{nd}$ intervals that captures data from the cognitive cubes and stores them into an array located in memory.
Figure 30:
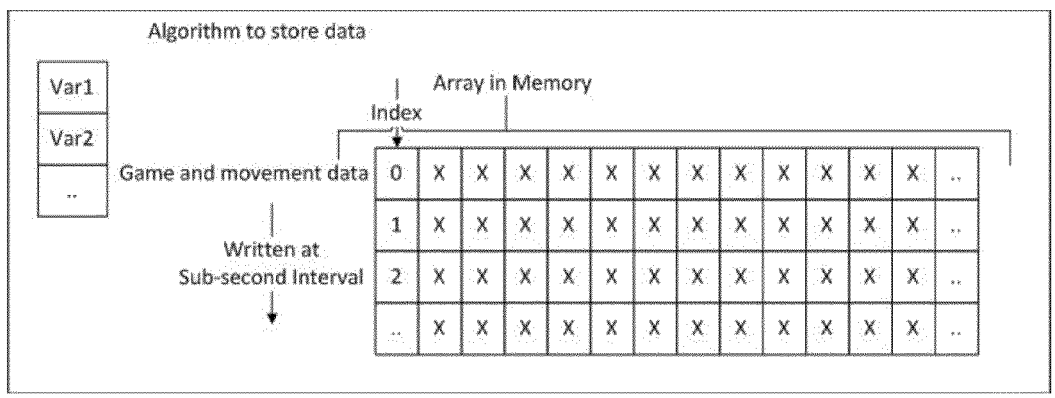
FIG. 30 illustrates a data array located in memory that is divided in the plurality arose written at a subsecond intervals, wherein each column is associated with a particular measurement taken from one or more of the cognitive cubes associated with a particular game.

Referring to FIGS. 28, 29 and 30, the game starts and the state machine stays in this state until the game finishes. Game logic drives the response of the player. Physical cube movement causes data input to the computer. (FIG. 29) This cube movement data is collected into an array in memory (FIG. 30), along with game data, at a sub-second interval during the game state. This data, which is stored logically as variables in C#, is written to an array. Data in the numeric and string variables is updated in real-time as the game is played in the game state. The variables are written directly and constantly to the array as the state machine progresses through the state and stops when the state stops.

Game data, listed in Table I, refers to randomized counters, in game events, images, timers, sequences, scoring counters, level counters, and other stimuli necessary to play games. The types and frequency of images and sound are important to all games for game play and creating a response by physically moving the cubes. These types of game objects are controlled through the Sifteo SDK. Variables from Table I are aggregated for inter-level, level and game perspectives for different types of analyses.

Physical movement data, also listed in Table I, includes any movement of the cube by the player. The Sifteo SDK event handlers are used to report physical responses to the cubes. The type of combined data captured from the game and from physical movement is seen in Table I.

TABLE I

| | | |
|---|---|---|
| 0 | AccountId | Unique owner/account id mapping to the device registration |
| 1 | PlayerId | Unique player id mapping to the player of the game |
| 2 | GameId | Random ID to differentiate game played |
| 3 | Event | General action in game for human reading purposes |
| 4 | DeviceId | Unique device id indicating which tangible device is being moved/used |
| 5 | ImageId | Unique image id representing image on device. ImageId explicitly designed to graphical image. |
| 6 | NewImageId | Boolean 1 or 0 variable indicating a new image is displayed or not. NewImageId = 1 when new image is displayed. Decision to display new image can be random or explicit in the game. |

TABLE I-continued

| # | Name | Description |
|---|---|---|
| 7 | SessionLevel | Session or level of the game |
| 8 | TiltX | TiltX = TiltLeft + TiltRight |
| 9 | TiltY | TiltY = TiltUp + TiltDown |
| 10 | TiltZ | $\sum_{m<TiltZ<n} f(TiltZ)$<br>m = TiltFlip, n = TiltFlipBack |
| 11 | Movement | Movement = TiltX + TiltY + TiltZ |
| 12 | TimeMovement | Movement/VirtualTicks |
| 13 | NeighboringEventOn | Boolean 1 or 0 variable indicating cubes moved together from neighboring event. NeighboringEventOn =1when cubes neighbored, else 0. Neighboring event handled by Sifteo SDK. |
| 14 | NeighborEventOff | Boolean 1 or 0 variable indcating cubes moved apart from neighboring event. NeighboringEventOff = 1 when cubes removed from neighboring event, else 0. Neighboring event handled by Sifteo SDK. |
| 15 | OffTiltCounter | Off response tilt counter. Counter increments on each tilt from point of device neighbor removal (after neighboring) until next image displayed.<br>$\sum_{m<Movement<n} f(Movement)$<br>m = NeighborEventOff, n = NewImageId |
| 16 | OnTiltCounter | On response tilt counter. Counter increments on each tilt from point new image is displayed until neighbored.<br>$\sum_{m<Movement<n} f(Movement)$<br>n = NeighborEventOn, m = NewImageId |
| 17 | TiltLeft | Tilt only to the left. Atomic data provided by Sifteo SDK. |
| 18 | TiltRight | Tilt only to the right Atonic data provided by Sifteo SDK. |
| 19 | TiltUp | Tilt only upwards. Atomic data provided by Sifteo SDK. |
| 20 | TiltDown | Tilt only downwards. Atomic data provided by Sifteo SDK. |
| 21 | TiltMiddle | Tilt return to middle. Atomic data provided by Sifteo SDK. |
| 22 | TiltFlip | Boolean 1 or 0. TiltFlip = 1 when cube is flipped over, otherwise 0. Sifteo SDK event handler controls flipping method. |
| 23 | TiltFlipBack | Boolean 1 or 0. TiltFlipBack = 1 when cube is flipped back over, otherwise 0. Sifteo SDK event handler controls flipping back method. |
| 24 | VirtualTicks | Measureable time unit recorded as ticks which operates within the state machine. Configurable measure. |
| 25 | Correct | Number of correct responses, as deemed by rules in the game, based on responses by a player in a game. For example, game defines correct response as NeighboringEventOn and NeighboringEventOff while only defined correct image is displayed. |
| 26 | Incorrect | Number of incorrect responses game, as deemed by rules in the game, based on responses by a player in a game. For example, game defines incorrect response as NeighboringEventOn and NeighboringEventOff while defined correct image is NOT displayed. |
| 27 | Response | Response = NeighboringEventOn + NeighboringEventOff |
| 28 | ImageDraws | Total number of images displayed during the game |
| 29 | CorrectDisplay | Number of correct images displayed during the game, as deemed correct by rules within the game. |
| 30 | ImageDisplayLength | Length of time image is displayed as defined by the number of VirtualTicks an image is assigned display on device. Configurable. |
| 31 | DateTime | Date and time game is played |
| 32 | DoubleHit | Count for double or multiple hits of neighboring device until next image displayed. DoubleHit is<br>$\sum_{i=m}^{n} x_i$<br>m = Response$_2$, n = NewImageId |
| 33 | FrameElapse | Actual state machine time in ticks elapsed for session and/or game |
| 34 | DeviceDistance | Fixed distance in inches devices may be placed apart. This varies by type of game and will vary by session as part of setup. |
| 35 | TopBottomHit | Measured by response to top or bottom of device. Count for device hits from top or bottom. |
| 36 | CubePressed | Number of times device is pressed and released. Atomic data provided by Sifteo SDK |
| 37 | CubeNCounter | Counter in VirtualTicks that starts when two or more devices are put together (neighbored) until the moment they are removed.<br>$\sum_{m<VirtualTicks<n} f(VirtualTicks)$<br>m = NeigbborEventOn n = NeighborEventOff |
| 38 | ResponseCounter | VirtualTicks between image displays, acts as control for response correct/incorrect.<br>$\sum_{m<VirtualTicks<n} f(VirtualTicks)$<br>m = Response$_x$, n = NewImageId |
| 39 | ResponseCorrect | VirtualTicks when image is displayed until correct response is hit. Delta between response counter measures response time.<br>$\sum_{m<VirtualTicks<n} f(VirtualTicks)$<br>m = Response$_{correct}$ n = NewImageId |
| 40 | ResponseIncorrect | Virtual ticks when image is displayed until incorrect response is hit. Delta between response counter measures response time.<br>$\sum_{m<VirtualTicks<n} f(VirtualTicks)$<br>m = Response$_{incorrect}$ n = NewImageId |
| 41 | CorrectReaction | VirtualTicks from when an image is displayed until a correct response.<br>$\sum_{m<VirtualTicks<n} f(VirtualTicks)$<br>n = Response$_{correct}$ m = NewImageId |
| 42 | IncorrectReaction | Number of VirtualTicks from when an image is displayed until an incorrect response.<br>$\sum_{m<VirtualTicks<n} f(VirtualTicks)$<br>n = Response$_{incorrect}$ m = NewImageId |
| 43 | OffTiltReaction | Amount of tilt (not ticks) from point of device neighbor removal (after neighboring) until next image displayed. Configurable to other events.<br>$\sum_{m<TimeMovement<n} f(TimeMovement)$<br>m = Response$_x$, n = NewImageId |
| 44 | OnTiltReaction | Amount of tilt (not ticks) for each device from point new image is displayed until device is neighbored. Configurable to other events.<br>$\sum_{m<TimeMovement<n} f(TimeMovement)$<br>n = Response$_x$ m = NewImageId |
| 45 | NeighborReaction | Amount of VirtualTicks from when two devices are put together (neighbored) until the moment they are removed.<br>$\sum_{m<VirtualTicks<n} f(VirtualTicks)$<br>m = NeighborEventOn n = NeighborEventOff |
| 46 | TouchReaction | Amount of touch for each device from configurable point in time. Atomic data provided as part of Sifteo SDK. |
| 47 | CubeLocation | The geometric coordinates of the cubes physical location. Atomic data provided as part of Sifteo SDK. |

TABLE I-continued

| | | |
|---|---|---|
| 48 | Omissions | Number of times the correct stimulus is presented and there is no response. Omissions = CorrectDisplay-Correct |
| 49 | Comissions | Number of times the correct stimulus is presented and a different stimulus is hit. Comissions = Incorrect |

Figure 31:
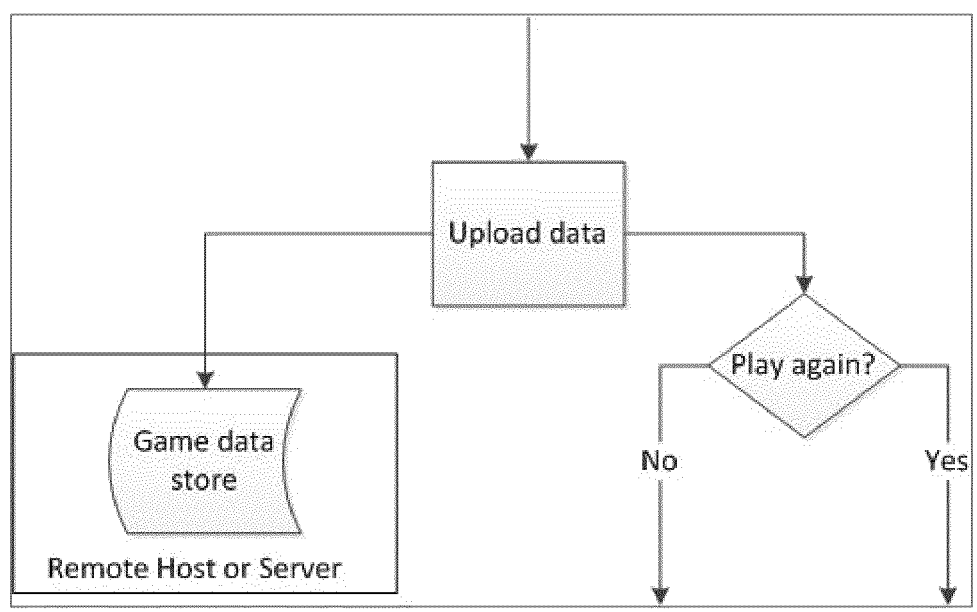
FIG. 31 illustrates the procedure for uploading game data into the game store located on the web server are host associated with a particular owner and in particular player. The player is given the option to play again, whereby a new set of data is accumulated, statistically analyzed and communicated to the web host or server.

Referring to FIG. 31, the game state ends after a defined period of time or a certain goal is achieved by the player. This varies depending on the game and is controlled by logic defined in the Sifteo SDK.

If the player chooses to play again, the state machine resets itself to the start state. If the player chooses not to play again, the state machine ends.

As illustrated in FIG. 31, when the game state ends, either because a set time elapsed or the player completed an objective, combined game and movement data that is stored in the array is uploaded and transferred through standard web protocols to a host or server computer based on the player and account registration identifier. An algorithm loops through the array storing the data and then .NET libraries are used to securely transfer the data. In the new version of the Sifteo SDK, C++ libraries can be used to accomplish the same task. The account registration and player identifiers are contained in the data that is uploaded (Table I). These exist because of account registration and player creation, which is important to this invention. It allows all of the collected game data to join to data stored on the host or server computer. This includes self-reported player demographic data, education, and medical history. See FIG. 25. Combined data, which includes game data, movement data, and player data, is analyzed to provide a complete player profile spanning multiple cognitive areas.

The game may employ distracters. FIG. 2 is exemplary, where a player is told to use the mallet to strike the gopher. The gopher appears randomly, and other figures, such as the boy mowing the grass may randomly appear along with the gopher to distract the player.

Figure 4:
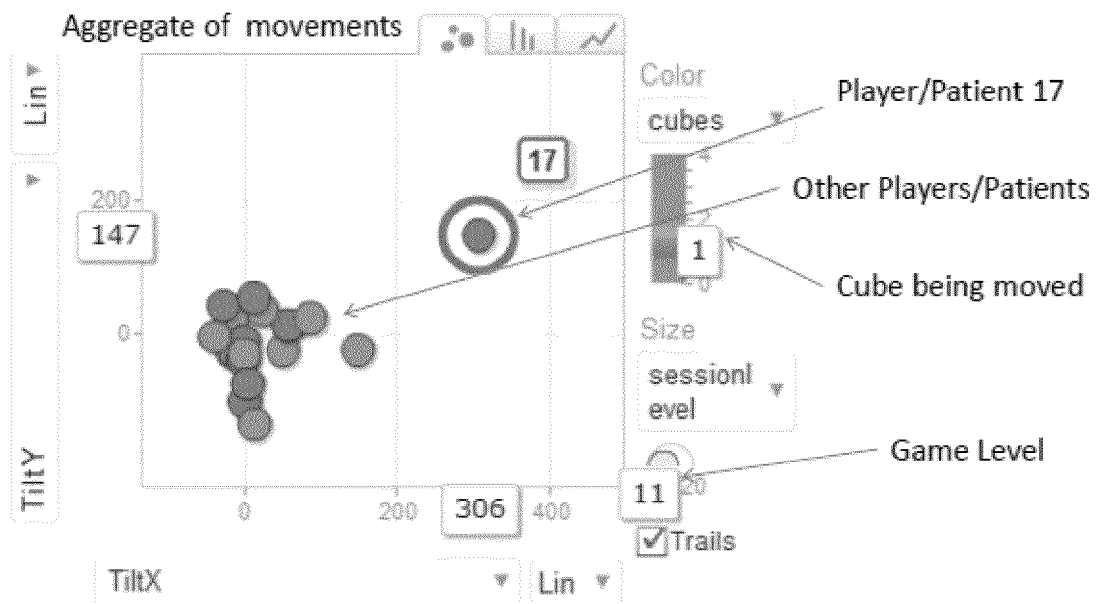
FIG. 4 illustrates a second game embodiment where one cube is a leader and a second cube is manipulated by a follower/patient.

FIG. 4, shows more details about player movements captured during the games. A player that has more or even less movement than other players or instructors will yield a different data profile which may indicate a cognitive deficit.

In clinical trials of the system conducted at the University of Minnesota, several classifier algorithms employed in the platform produce statistically significant results in predicting diagnoses, type, and comorbidities based on combined player/patient data and demographic education and medical data. Said classifier algorithms rely on transformed data from the game. For example, neighbor_reaction time (Table I, item 45) is a transformed variable. It is computed as follows. When considering the variables in Table I, first subtracting VirtualTicks-CubeNCounter, and then taking the maximum CubeNCounter when considering this difference per game instance, and then lastly taking the summation of the CubeNCounter per game instance, results in the total amount of neighbor reaction per game played. Sample SQL code to create this transformed variable is seen here:

```
select sum(counter) neighbor_reaction, gameid
    from
    (
    select max(cubencounter) counter, diff, gameid
        from
    (select gameid,
        event,
```

TABLE II

Players Analysis Beta
Summary | By Session | Charts | Detail

| Player | Session | Avg Correct | Avg Incorrect | Avg Omissions | Avg Score | Games Played | Avg Reaction Time | Avg Movement | Game |
|---|---|---|---|---|---|---|---|---|---|
| kinha | 1 | 1.00 | 1.00 | 14.00 | 0.00 | 1 | | 3.00 | Groundskeeper |
| kinha | 2 | 1.00 | 1.00 | 10.00 | 0.00 | 1 | | 3.00 | Groundskeeper |
| kinha | 3 | 1.00 | 1.00 | 11.00 | 0.00 | 1 | | 3.00 | Groundskeeper |
| kinha | 4 | 1.00 | 1.00 | 13.00 | 0.00 | 1 | | 3.00 | Groundskeeper |
| kinha | 5 | 2.00 | 1.00 | 18.00 | 1.00 | 1 | 4.00 | 4.00 | Groundskeeper |
| kinha | 6 | 1.00 | 1.00 | 10.00 | 0.00 | 1 | | 3.00 | Groundskeeper |
| kinha | 7 | 3.00 | 2.00 | 3.00 | 1.00 | 1 | 4.00 | 8.00 | Groundskeeper |
| kinha | 8 | 2.00 | 1.00 | 9.00 | 1.00 | 1 | 3.00 | 5.00 | Groundskeeper |
| rooster | 1 | 10.67 | 3.00 | 1.00 | 7.67 | 3 | 3.54 | 26.00 | Groundskeeper |
| rooster | 2 | 6.67 | 4.00 | 4.00 | 2.67 | 3 | 5.69 | 19.33 | Groundskeeper |
| rooster | 3 | 9.00 | 3.33 | 2.00 | 5.67 | 3 | 3.55 | 21.67 | Groundskeeper |
| rooster | 4 | 7.67 | 3.67 | 3.33 | 4.00 | 3 | 6.15 | 16.33 | Groundskeeper |
| rooster | 5 | 6.33 | 1.33 | 4.67 | 5.00 | 3 | 3.71 | 14.33 | Groundskeeper |
| rooster | 6 | 8.00 | 3.67 | 1.67 | 4.33 | 3 | 3.41 | 13.67 | Groundskeeper |
| rooster | 7 | 7.00 | 4.33 | 1.00 | 2.67 | 3 | 3.52 | 20.33 | Groundskeeper |
| rooster | 8 | 8.33 | 2.33 | 1.67 | 6.00 | 3 | 8.38 | 13.67 | Groundskeeper |

Table II shows summary statistics for a game representing some factors that are indicative of impulsivity and inattention. These summary statistics are generated through summation, averaging, and standard deviation operations of response metrics across game data by player. Inattention will in general have more errors of omission and less tilt movements than control. Impulsivity will be represented as more commission and greater tilting movements than control. This pattern of response is derived from the physical movement of the cubes to various sound and image stimuli.

-continued

```
    cubeid,
    datetime,
    sessionlevel,
    virtualticks,
    cubencounter,
    (virtualticks-cubencounter) diff
    from Game_Table
```

-continued

```
where (virtualticks-cubencounter) < virtualticks
order by sessionlevel, virtualticks ) as b
group by diff, gameid) as f
group by gameid
```

Said algorithms results in probabilistic output stating that player is a certain percent likely to have or not have diagnosis and type of cognitive disorder like ADHD, ASD, anxiety, or depression. These results can be used as a diagnostic aid and/or for intervention. Exemplary results are illustrated in FIG. 32.

Symptoms of inattention are indicated by increased reaction time measured in virtual ticks, fewer commissions as defined in Table II, and less accessory movements as measured by TiltX+TiltY+TiltZ, as defined in Table I, than control.

Hyperactivity and impulsivity is determinable by more commissions, as defined in Table I, specifically when the spatial component, as determined by measuring spatial coordinates, is introduced in the game level, and this causes decreased overall reaction time compared to control. There are several types of reaction time, measured in ticks by the point in time a new stimulus is presented to the point of response. Different types of reaction time are captured based on correct or incorrect responses.

ASD symptoms are determined by more omissions, specifically when the spatial component, as determined by measuring spatial coordinates, is introduced in the game level, over control; and wherein more commissions are determined, as defined in Table I, in response to a disturbance.

Anxiety symptoms are determined by an uneven distribution of reaction time over sessions in comparison to controls, as measured in ticks by the point in time a new stimulus is presented to the point of response. Different types of reaction times are captured based on correct or incorrect responses. It is also determined by more omissions, as defined in Table I, compared to control. Further, increased movement as defined by Table I, compared to control is also presented.

Depression symptoms are determined by more omissions and commissions as defined in Table I, increased cube neighbor reaction time, as defined in Table I, and further increased neighbor reaction time when spatial relationships, as determined by measuring spatial coordinates, are applied compared to control.

We claim:

1. A statistical data gathering system, comprising;
a base device;
a plurality of cubes, the cubes responding to three dimensional movement and neighboring with other cubes to transmit data regarding its three dimensional location and neighboring with other cubes to the base station;
wherein the base devise is configured to selectively transmit images and sound to the cubes such that a player has to perform a predefined action in response;
the base device further configured to periodically capture said data from the cubes and record the data into a table, the data including data pertinent to a cognitive disorder;
the base device further configured to determine statistics from said table, the statistic including sums, averages, standard deviation to produce response metrics that are indicative of a cognitive disorder;
a web-based server configured to store player data, including the player's name and medical history; and
wherein the base device is configured to determine a unique number associated with a particular set of cubes and to use this number to communicate with the web-based server;
wherein the base device is further configured to instruct the player to play a game with the cubes which involves the player reacting a specific manner to a plurality of difference cube configurations; or by following the lead of a lead cube manipulated by a person other than the player being diagnosed;
wherein the specific configurations include predetermined disturbance configurations, the reaction to such disturbances comprising an indicia of a cognitive disorder; and
wherein the symptoms of inattention are determined by comparing reaction time, fewer commissions, and less accessory movements, with control;
wherein, based on summary statistics, hyperactivity and impulsivity symptoms are determined by comparing more commissions, when the spatial component, as determined by measuring spatial coordinates, is introduced in the game level, and decreased overall reaction time is compared to control;
wherein, based on summary statistics, ASD symptoms are determined by comparing over control more omissions, specifically when the spatial component, as determined by measuring spatial coordinates, is introduced in the game level; and wherein more commissions are determined, in response to a disturbance;
wherein, based on summary statistics, anxiety symptoms are determined by an uneven distribution of reaction times over sessions in comparison to controls, as measured in ticks by the point in time a new stimulus is presented to the point of response; wherein increased movement is compared to control; or
wherein, based on summary statistics, depression symptoms are determined by more omissions and commissions, increased cube neighbor reaction time, and further increased neighbor reaction time when spatial relationships, as determined by measuring spatial coordinates, are applied compared to control.

2. The system of claim 1 wherein the base device and web-based server are mutually configured to download to the base device pertinent player data for every player associated with a set of cubes.

3. The system of claim 1, the table being configurable to record in the table the occurrence of specific disturbance configurations, wherein the data from said table following said disturbance configuration being selectively analyzable to determine particular responses.

4. A statistical data gathering system, comprising;
a base device;
a plurality of cubes, the cubes responding to three dimensional movement and neighboring with other cubes to transmit data regarding its three dimensional location and neighboring with other cubes to the base station;
wherein the base devise is configured to selectively transmit images and sound to the cubes such that a player has to perform a predefined action in response;
the base device further configured to periodically capture said data from the cubes and record the data into a table, the data including data pertinent to a cognitive disorder;
the base device further configured to determine statistics from said table, the statistic including sums, averages, standard deviation to produce response metrics that are indicative of a cognitive disorder;

a web-based server configured to store player data, including the player's name and medical history; and wherein the base device is configured to determine a unique number associated with a particular set of cubes and to use this number to communicate with the web-based server; and further wherein the base device is configured to display player names on a cube, and in response tangible manipulation, allows a player and/or a clinician to select a player through tilting a cube, thereby allowing the base device to link a set of cubes to a remote system containing medical history and patient data of disturbance configuration in relation to movement, spatial components and coordinates.

\* \* \* \* \*